US010933693B2

(12) United States Patent
Wells

(10) Patent No.: US 10,933,693 B2
(45) Date of Patent: Mar. 2, 2021

(54) CASTER ADAPTER AND METHODS RELATED THERETO

(71) Applicant: Direct Scaffold Supply, LP, Houston, TX (US)

(72) Inventor: Matthew G. Wells, Houston, TX (US)

(73) Assignee: Direct Scaffold Supply, LP, Houston, TX (US)

( * ) Notice: Subject to any disclaimer, the term of this patent is extended or adjusted under 35 U.S.C. 154(b) by 0 days.

(21) Appl. No.: 15/867,660

(22) Filed: Jan. 10, 2018

(65) Prior Publication Data

US 2018/0194166 A1 Jul. 12, 2018

Related U.S. Application Data

(60) Provisional application No. 62/444,372, filed on Jan. 10, 2017.

(51) Int. Cl.
*B60B 33/00* (2006.01)

(52) U.S. Cl.
CPC ........ *B60B 33/0021* (2013.01); *B60B 33/001* (2013.01); *B60B 33/0023* (2013.01)

(58) Field of Classification Search
CPC ....... B60B 29/002; B60B 30/10; B60B 33/00; B60B 33/001; B60B 33/0018;
(Continued)

(56) References Cited

U.S. PATENT DOCUMENTS 1,171,569 A * 2/1916 Wanda ................ B60B 33/0002
16/30
1,532,064 A * 3/1925 Neiswender ........ B60B 33/0002
16/21

(Continued)

FOREIGN PATENT DOCUMENTS

DE 2310765 B1 1/1974
DE 20115542 U1 6/2002

OTHER PUBLICATIONS

Thomas, Shane, PCT/US2018/013225 International Search Report, dated Mar. 26, 2018.

*Primary Examiner* — Chuck Y Mah
(74) *Attorney, Agent, or Firm* — Martinez Law Group PLLC; Melissa M. Martinez

(57) ABSTRACT

An exemplary embodiment of a caster adapter includes a connecting base for coupling the caster adapter to a caster, at least two panels forming at least part of an adapter member and defining the interior of the adapter member wherein at least a portion of a leg of an object is insertable into the interior of the adapter member. The adapter member may contain a leg conforming portion that protrudes outward from the interior of the adapter member and corresponds with a leg protrusion on a leg of an object wherein the leg protrusion will fit within the leg conforming portion such that the object may be lifted off the ground without the caster adapter, and coupled caster, slipping off of the leg. The leg may be inserted into the caster adapter through an opening in the side of the adapter member, wherein the opening is blocked by the use of at least one containment member interacting with the adapter member. The leg conforming portion may be customized depending on the leg protrusion location and size on the subject leg. The containment member not only acts to retain the leg within the caster adapter but also allows for quick release of the caster adapter from the leg. The adapter member of the caster adapter is customizable to fit various geometries of legs. The containment member may be retained in proximity to the caster adapter through the use of an attachment member that is attachable to the adapter member and the containment member.

20 Claims, 9 Drawing Sheets

(58) Field of Classification Search
CPC ............ B60B 33/0002; B60B 33/0023; B60B
33/0026; B60B 33/04; B60B 33/0042;
B60B 33/0044; B62B 230/08; B62B
230/10; B62B 2202/02; B62B 2202/10;
B62B 2202/12; B62B 2206/02; B62B
5/0083; B62B 5/0086; B62B 3/02; B62B
3/002; B62B 1/12; B62B 1/16; B62B
1/264; A47B 91/06; A47B 91/12; A47B
91/16; Y10T 16/19; Y10T 16/191; Y10T
16/203
See application file for complete search history.

(56) References Cited

U.S. PATENT DOCUMENTS

| | | | | |
|---|---|---|---|---|
| 1,827,972 | A * | 10/1931 | Darnell | A47B 91/06 16/42 R |
| 2,175,317 | A * | 10/1939 | Rogers | B60B 33/0002 16/29 |
| 2,502,759 | A * | 4/1950 | Singer | A47B 91/04 16/21 |
| 2,691,793 | A * | 10/1954 | Jacobs | B60B 33/00 16/18 R |
| 2,774,609 | A * | 12/1956 | Winger | B62B 3/02 280/79.11 |
| 3,446,309 | A | 5/1969 | Davis et al. | |
| 3,667,085 | A * | 6/1972 | Cumella | B60B 33/0002 16/30 |
| 3,861,703 | A * | 1/1975 | Gould | A45C 5/143 190/18 A |
| 4,227,281 | A * | 10/1980 | Chung | B60B 33/0002 16/29 |
| 4,249,282 | A | 2/1981 | Little | |
| 4,576,391 | A * | 3/1986 | Gerstner | B60B 33/0002 16/30 |
| 4,719,663 | A * | 1/1988 | Termini | B60B 33/0002 16/30 |
| 4,843,678 | A * | 7/1989 | Park | B60B 33/0002 16/30 |
| 5,069,309 | A * | 12/1991 | Swiderski | E04G 1/20 16/30 |
| 5,313,077 | A | 5/1994 | Gutierrez | |
| 5,330,064 | A * | 7/1994 | Hall | A47F 5/135 16/29 |
| 5,457,849 | A * | 10/1995 | Branson | B60B 33/04 16/19 |
| 5,575,036 | A * | 11/1996 | May | B60B 33/06 16/32 |
| 5,727,284 | A * | 3/1998 | Deutsch | A47B 91/002 16/18 R |
| 5,740,584 | A * | 4/1998 | Hodge | B60B 33/0002 16/30 |
| 5,956,805 | A * | 9/1999 | Huang | B60B 33/06 16/19 |
| 6,290,194 | B1 | 9/2001 | Chaconas et al. | |
| 6,450,515 | B1 * | 9/2002 | Guth | B60B 33/0063 16/30 |
| 6,592,134 | B2 * | 7/2003 | Abraham | B62B 5/0083 16/29 |
| 6,899,345 | B1 * | 5/2005 | Bearden | A01D 34/74 16/19 |
| 7,036,631 | B2 * | 5/2006 | Feik | E06C 1/397 182/127 |
| 7,162,772 | B2 * | 1/2007 | Asher | B60B 33/0002 16/29 |
| 7,762,566 | B2 * | 7/2010 | Wang | B62B 5/0083 280/651 |
| 8,302,256 | B1 * | 11/2012 | Spraley | B60B 33/0005 16/30 |
| 8,978,202 | B2 * | 3/2015 | Cook | B60B 33/0023 16/18 R |
| 9,221,300 | B1 * | 12/2015 | Pastore | B60B 33/00 |
| 9,221,301 | B1 * | 12/2015 | Pastore | B60B 33/02 |
| 2003/0094554 | A1 * | 5/2003 | Bushey | B60B 33/0002 248/223.41 |
| 2003/0127815 | A1 * | 7/2003 | Hall | B60B 33/0002 280/79.3 |
| 2005/0015928 | A1 * | 1/2005 | Arsenault | B60B 33/0002 16/300 |
| 2006/0038369 | A1 | 2/2006 | Abraham | |
| 2013/0104337 | A1 * | 5/2013 | Nabb | B60B 33/0026 16/30 |

* cited by examiner

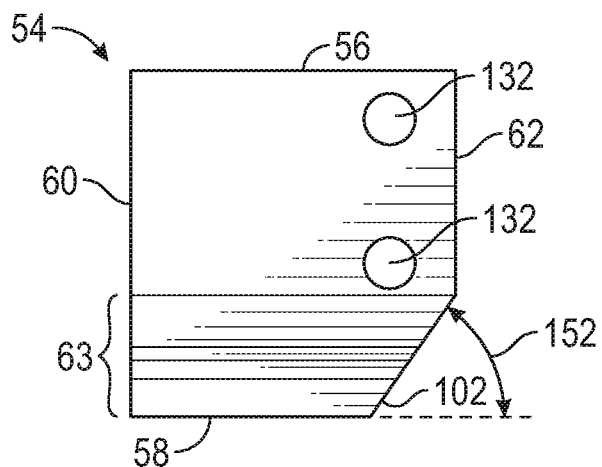
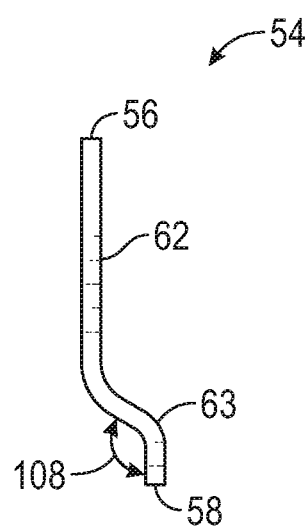
FIG. 6A  FIG. 6B
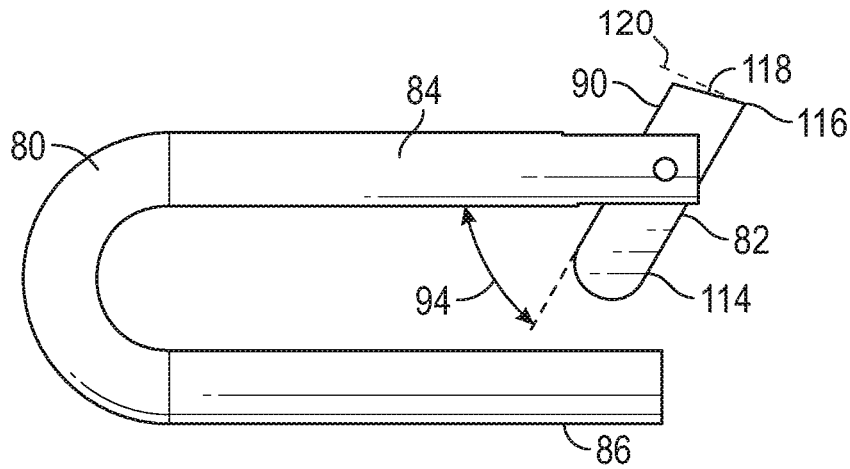
FIG. 7A
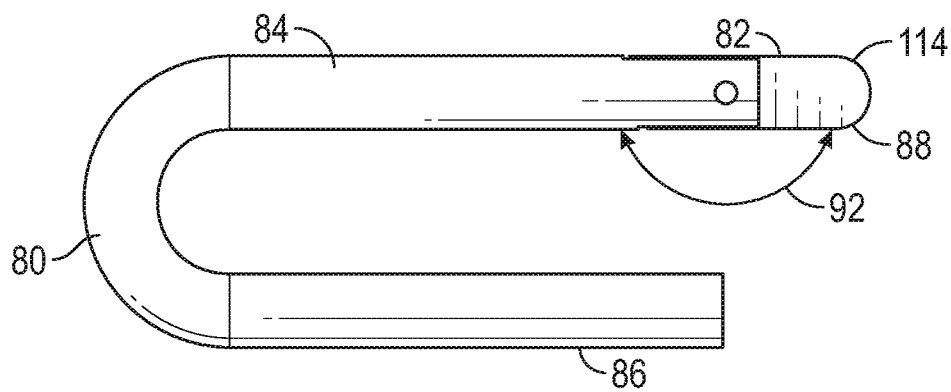
FIG. 7B

CASTER ADAPTER AND METHODS RELATED THERETO

CROSS-REFERENCE TO RELATED APPLICATIONS

This application claims the benefit of U.S. provisional application Ser. No. 62/444,372 filed on Jan. 10, 2017, which is incorporated herein by reference as if reproduced in full below.

STATEMENT REGARDING FEDERALLY SPONSORED RESEARCH OR DEVELOPMENT

Not applicable.

FIELD OF THE DISCLOSURE

The disclosure relates generally to adapters for removably mounting a caster onto an object.

BACKGROUND AND BRIEF SUMMARY OF THE DISCLOSURE

Under various circumstances and in various industries, it is often necessary to move objects from one location to another; however, often times the objects will be large and cumbersome or filed with materials thereby making same heavy and difficult to move. The objects may not be equipped with means that would allow for ease of movement, such as rollers or wheels. It may not be convenient or practical to move such objects with machinery, and even if some part of the move may be accomplished by machinery, it may be necessary or desired to complete some portion of the movement by human power.

A caster adapter is provided herein that may be coupled to a caster assembly such that one or more caster assemblies may be attached, removably or permanently, to one or more legs of an object. An exemplary embodiment of the caster adapter includes a connecting base for coupling the caster adapter to a caster, and an adapter member coupled to the connecting base for coupling the caster adapter to a portion of an object. The adapter member may also be coupled to at least one containment member that will act to secure the caster adapter to at least one leg of the object. At least a portion of the leg of an object may be inserted within the adapter member in order to removably couple the caster assembly to the object.

In an exemplary embodiment, the adapter member may further comprise a leg conforming portion extending at least partially therein or thereon. The leg conforming portion may be shaped to conform to at least a portion of the leg of the object, wherein such portion of the leg of the object protrudes out from the leg such that the protruding portion of the leg will fit into at least a portion of the leg conforming portion thereby interacting with same to aid in maintaining the coupling of the leg to the caster adapter. This is especially helpful in the event the object is lifted with the caster adapter installed thereon such that the interaction between the leg conforming portion and the outer protrusion on the leg will act to retain the caster adapter on the leg thereby preventing the caster adapter from slipping off of the leg. The interaction of this additional surface area along the leg that interacts with the leg conforming portion of the caster adapter and the areas proximate the leg conforming portions allow for the retainment of the caster adapter onto the leg, which aids in ease of movement of the object by forklift or other means while the caster adapters are installed on the legs of the object.

The adapter member contains an opening on a side thereon that allows for at least a portion of the leg of the object to be inserted into the caster adapter. In an exemplary embodiment, a containment member is used to block the opening in the adapter member that the leg was initially inserted through, thereby helping to maintain the coupling engagement of the leg and the caster adapter.

In a further exemplary embodiment, the containment member may be utilized with the leg conforming portion to further secure the leg to the caster adapter. By way of example, the leg conforming portion may extend along some portion of the adapter member wherein the leg may be slid into the adapter member though the opening in the adapter member such that the corresponding portion of the leg will interact with the leg conforming portion. The containment member may then be secured along at least a portion of the adapter member thereby preventing the leg from sliding out of the interior of the adapter member by sufficiently blocking the opening of the adapter member. The interaction of the leg conforming portion with the corresponding section of the leg acts to restrict movement of the caster adapter along the length of the leg thereby preventing the caster adapter from slipping off the leg while the containment member's placement in relation to the caster adapter prevents the leg from disengaging from the interior of the adapter member through its leg insertion opening. In this instance, the interaction of the leg conforming member with the leg may prevent substantial axial movement of the leg while the containment member may prevent substantial lateral movement of the leg through the opening in the adapter member. Neither the leg conforming portion nor the containment member are necessary components and either or both may be omitted when the user does not deem them needed for the particular caster adapter installation.

The adapter member may be comprised of at least two panels, and at least one containment member interacting with the panels such that the caster adapter is maintained in position relative to the leg of the object. The panels may have leg conforming portions thereon that will extend as needed to provide space within the adapter member for any flares of the leg or other additional surface areas or other protrusions along the leg.

The containment member may also allow for quick release of the caster adapter from the leg. The adapter member of the caster adapter is customizable to fit various geometries of legs.

Other features and advantages of the various embodiments of the invention will be apparent from the following detailed description, the accompanying drawings, and the appended claims.

BRIEF DESCRIPTION OF THE DRAWINGS

For a more complete understanding of the embodiments of the invention, reference is now made to the following Detailed Description of Various Embodiments of the Invention, taken in conjunction with the accompanying drawings, in which:

FIG. 6A is a back view of an exemplary second side panel.

FIG. 6B is a side view of the exemplary second side panel in FIG. 6A.

FIG. 7A is a front view of an exemplary embodiment of the containment member showing the retainment member in its locked position.

FIG. 7B is a front view of the containment member of FIG. 7A showing the retainment member in its unlocked position.

DETAILED DESCRIPTION OF EXEMPLARY EMBODIMENTS

Figure 1:
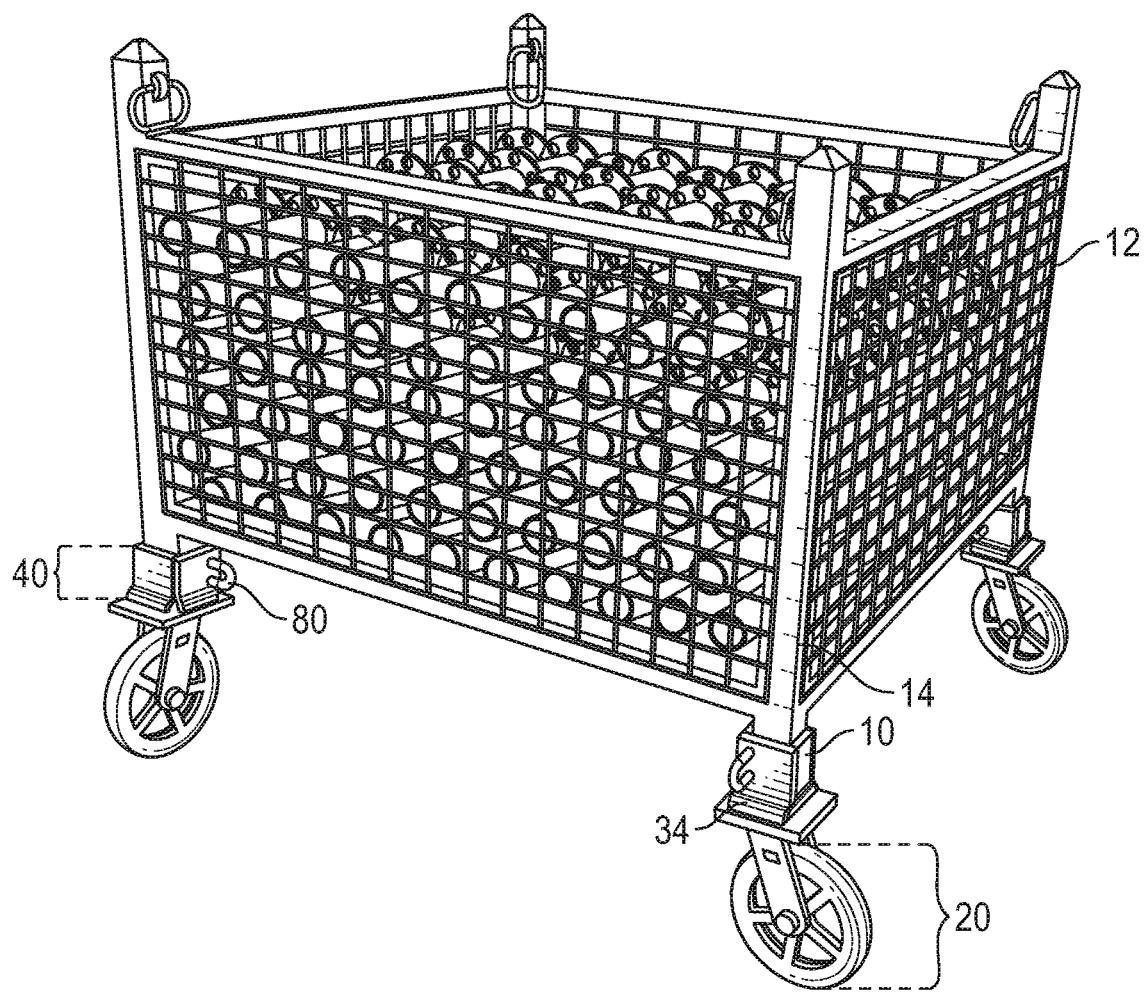
FIG. 1 is a perspective view of an exemplary embodiment of the invention as coupled to respective casters and installed on a basket.

The described exemplary and alternative embodiments of the invention are best understood by referring to the drawings, like numerals being used for like and corresponding parts of the various drawings.

Figure 2:
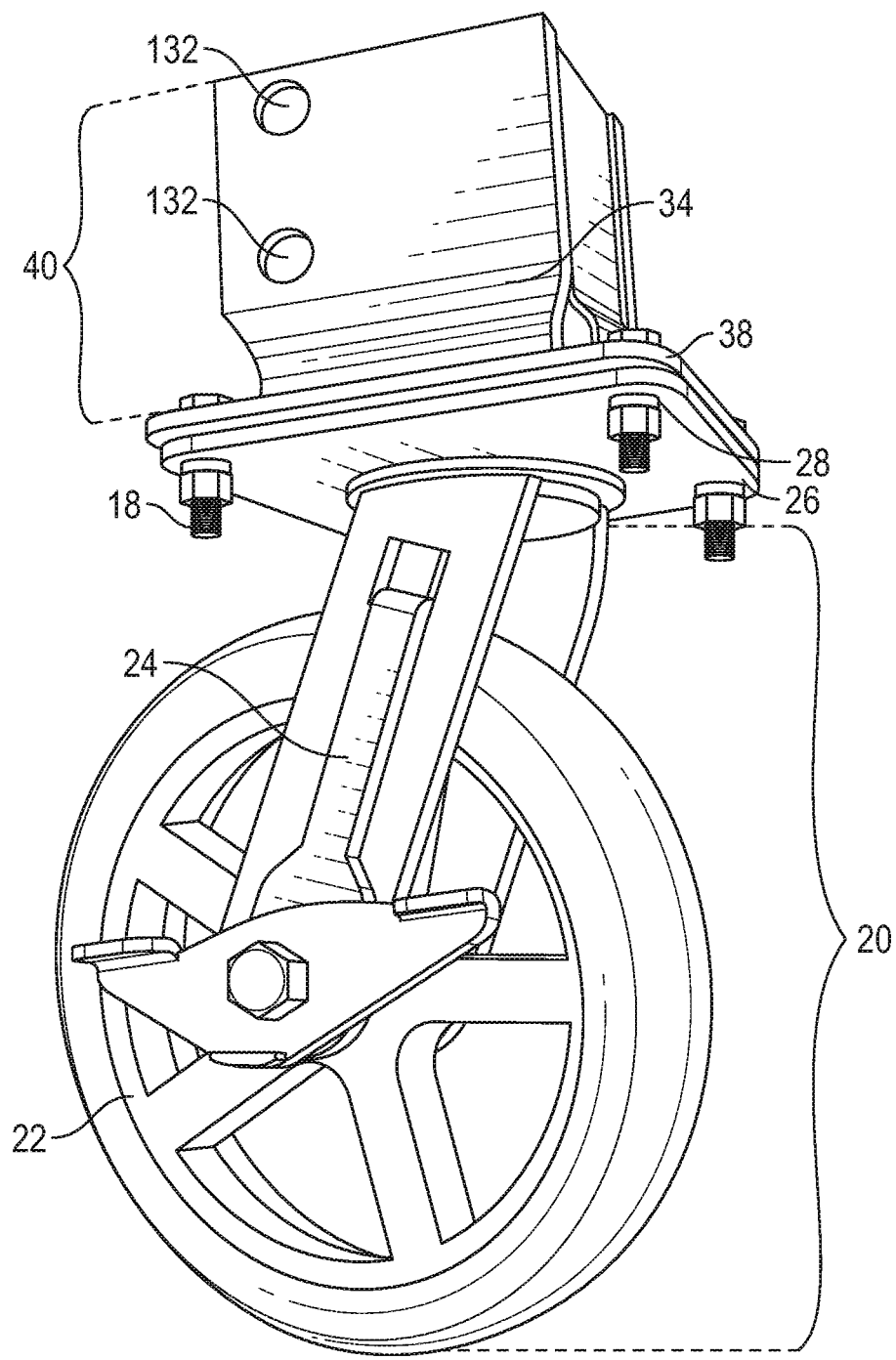
FIG. 2 is a perspective view of an exemplary embodiment of the invention that is removably connected to a caster.
Figure 3A:
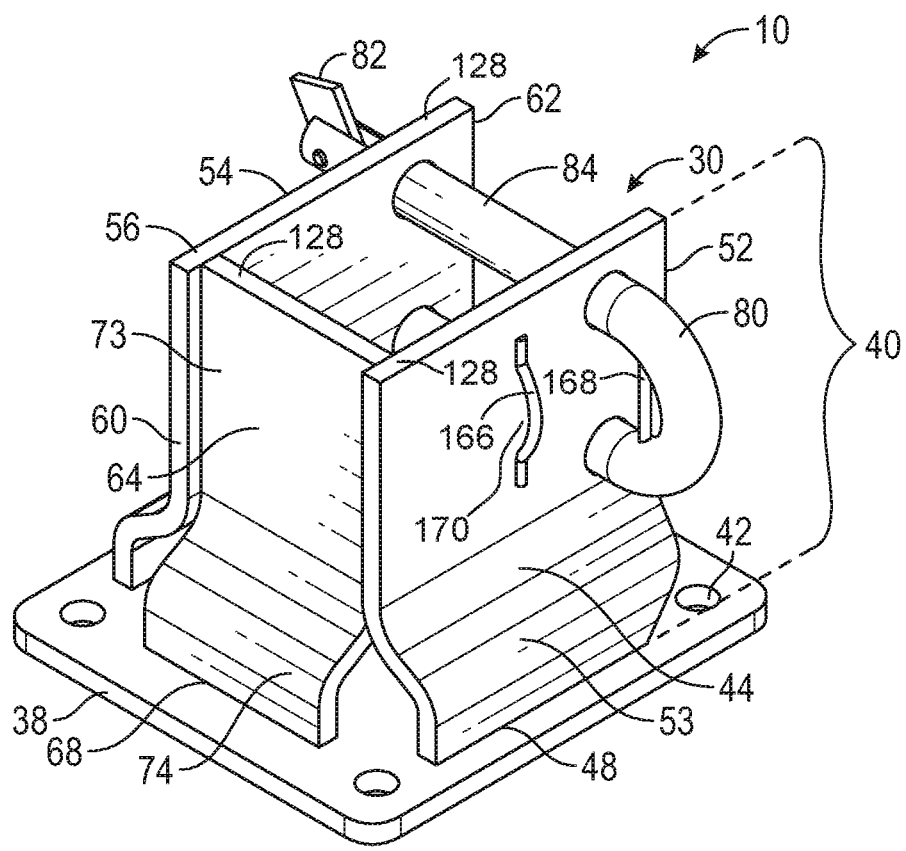
FIG. 3A is a perspective view of an exemplary embodiment of the invention.

In FIGS. 1, 2, and 3A, there is shown an exemplary embodiment of a caster adapter 10. FIG. 2 shows the caster adapter 10 removably attached, through the use of fasteners 18, to an exemplary caster assembly 20. FIG. 1 shows a set of caster adapters 10 removably connected to the respective caster assemblies 20, wherein the caster adapters 10 are installed on an object 12, said object 12 being an exemplary basket.

Referring to FIGS. 1 and 2, caster assemblies 20 are used in various configurations to facilitate movement of various objects 12. While caster assemblies 20 are generally available in various configurations, it is typical for a caster assembly 20 to be comprised of a wheel 22, which provides movement of the object 12 once connected thereto, and a connecting member 24 that is functionally connected to the wheel 22, wherein the connecting member 24 allows for functional coupling of the wheel 22 to the object 12. In the particular example shown in FIG. 2, the connecting member 24 of the caster assembly 20 is functionally coupled to a flat, rectangular caster top plate 26; however, it will be understood by those in the art that while a particular type of caster assembly 20 with a particular type of connecting member 24 having a caster top plate 26 is shown, the connecting base 38 of the caster adapter 10 may be configured for use with any type of caster assembly 20 having any type of connecting assembly, such as locking casters, kingpinless caster assemblies, hollow kingpin caster assemblies, stem caster assemblies, plate caster assemblies having various orifice 28 patterns and/or plate 26 shapes, stem casters, swivel caster assemblies, ridged caster assemblies, and any other type of caster assembly 20 now known or later developed. Alternatively, an adapter (not shown) for facilitating the coupling between the caster adapter 10 and caster assembly 20 may be connected to the caster assembly 20 to allow for its use with the depicted connecting base 38 of the caster adapter 10.

The exemplary caster top plate 26 shown is a generally square or rectangular flat member with at least one connecting orifice 28 extending through the caster top plate 26 at each of its four corners 30 for connection to the caster adapter 10. While a generally square or rectangular flat member is depicted, the caster top plate 26 may vary in shape and size to accommodate the subject caster assembly 20. Further, the caster top plate 26 may contain more or less connecting orifices 28 than depicted depending on the shape and configuration of the caster top plate 26, which amount may correspond to the number of corresponding connection interfaces 42 of the caster adapter 10 or may not equate to the number of connection interfaces 42. The connecting orifices 28 may be arranged in varying patterns depending on the placement of the corresponding connection interfaces 42 of the caster adapter 10. Finally, embodiments of the invention may not utilize orifices 28 at all but rather may utilize other means to functionally couple the caster assembly 20 to the caster adapter 10, such as through the use of welds or various clamps. The purpose of the connecting orifice 28 on the caster top plate 26 is to functionally couple the caster assembly 20 to the caster adapter 10, which coupling may be accomplished by various known and/or later discovered methods.

Referring to FIGS. 2, 3A, 3B, and 3C, an exemplary caster adapter 10 comprises a connecting base 38 coupled to an adapter member 40. The connecting base 38 couples the caster adapter 10 to the caster assembly 20 by connecting, directly or indirectly, to the caster top plate 26. The connection between the caster top plate 26 of the caster assembly 20 and the connecting base 38 of the caster adapter 10 may be a permanent coupling or may be a temporary and removable coupling. The connecting base 38 is a generally flat and square or rectangular member having connection interfaces 42 located at each corner. The connection interfaces 42 are depicted as orifices that are capable of accepting a fastener 18, such as a bolt, therethrough; however, those skilled in the art will understand that any type of fastener 18 that is capable of withstanding the forces to be applied to the combined caster assembly 20 and caster adapter 10 while in use may be utilized to combine the caster assembly 20 and caster adapter 10 as taught herein. Therefore, the connection interfaces 42 and the connecting orifices 28 may not consist of orifices at all as the structure of same is highly dependent on the connection method that will be utilized. When orifices are utilized at least some of the connection interfaces 42 will line up with connecting orifices 28 on the caster top plate 26 of the caster assembly 20 for connection therebetween utilizing one or more fasteners 18. In practice the number and/or location of the connection interfaces 42 and connection orifices 28 may vary depending on the type of caster assembly 20 the caster adapter 10 is to be used with. The purpose of the connection interfaces 42 and connection orifices 28 is to facilitate the coupling, either removably or permanently, of the caster assembly 20 to the caster adapter 10 such that the caster assembly 20 may be attached to the leg 14 of an object 12 via the caster adapter 10.

It will be understood by those in the art that the caster adapter 10 may be connected to its respective caster assembly 20 by any now known or later discovered manner. While this particular exemplary embodiment has orifices as the connection interfaces 42 and connection orifices 28, in practice the structure of the connection interfaces 42 and connection orifices 28 may vary as needed in relation to the type of caster assembly 20 to be utilized with the caster adapter 10 and/or the desired connection therebetween. As an example, in an alternative embodiment the caster assembly 20 may be welded or otherwise permanently attached to the caster adapter 10 wherein the connection interfaces 42 and connection orifices 28 may be welded connections.

The adapter member 40 is shaped to accept at least a portion of a leg 14 of an object 12, such as a basket (an example of which is shown in FIG. 1), racks, scaffolds, or any other objects 12 that may be moved utilizing wheels, which wheels may be attached to the object 12 via the caster adapter 10. The adapter member 40 generally comprises at least two panels 44, 54, and/or 64. While the depicted panels 44, 54, and/or 64 are generally planar, this is not a necessity and the panels 44, 54, and/or 64 may be curved or otherwise non-planar as desired or needed. The adapter member 40 may utilize at least one containment member 80 to retain the leg 14 at least partially within the interior 32 of the adapter member 40. The exemplary embodiment of the adapter member 40 shown in FIGS. 1, 2, 3A, 3B, and 3C comprises a containment member 80, a back panel 64, and two side panels: a first side panel 44 and a second side panel 54.

The panels 44, 54, and/or 64 may be configured to conform to the shape of the legs 14 of various objects 12 or may be generally configured to accept various sized legs 14. The adapter member 40 may utilize a leg conforming portion 34 to provide the shape to conform to at least a portion of a leg 14 of an object 12. When installed on a connecting base 38, the desired number of panels 44, 54, and/or 64 combine to form the adapter member 40 wherein the installed panels 44, 54, and/or 64 define the interior 32 of the adapter member 40. When the caster adapter is installed on the leg 14 of an object 12, at least a portion of the leg 14 will be contained in the interior 32 of the adapter member 40.

The caster adapter 10 may have a leg conforming portion 34 extending along at least a portion of the adapter member 40. The leg conforming portion 34 is a protrusion or series of protrusions 53, 63, and/or 74 that extend outward away from the interior 32 of the adapter member 40. A portion of the leg conforming portion 34 may be formed in at least one of the panels 44, 54, and/or 64 which forms the adapter member 40.

The panels 44, 54, and/or 64 are positioned to provide an opening 30 in the adapter member 40, wherein the opening 30 allows for the insertion of at least a portion of the leg 14 into the interior 32 of the adapter member 40. At least one containment member 80 traverses the opening 30 between adjacent panels 44, 54, and/or 64 and couples the adjacent panels 44, 54, and/or 64 in order to block the opening 30. It is not necessary that the leg 14 fit wholly within the interior 32 of the adapter member 40. The leg 14 may be placed such that it will partially fit within the interior 32 and the containment member 80 may be fastened to adjacent panels 44, 54, and/or 64 to prevent the dislodgement of the leg 14 from within the interior 32 of the adapter member 40. The various configurations of the panels 44, 54, and/or 64 and the containment member 40 aid in retaining the caster adapter on the legs 14 of the respective objects 12.

Referring to FIGS. 3A, 3B, 3C, 4A and 4B, an exemplary embodiment of a back panel 64 is shown. The back panel 64 has a top surface 66, an opposite bottom surface 68, a first side surface 72, and an opposite second side surface 73. The back panel 64 couples to the connecting base 38 proximate its bottom surface 68. The back panel 64 is capable of coupling with additional panels 44, 54, and/or 64 along its first side surface 72 and/or second side surface 73 in order to form a complete adapter member 40, with or without an opening 30, in a configuration suitable for attaching to the subject leg 14.

Figure 1A:
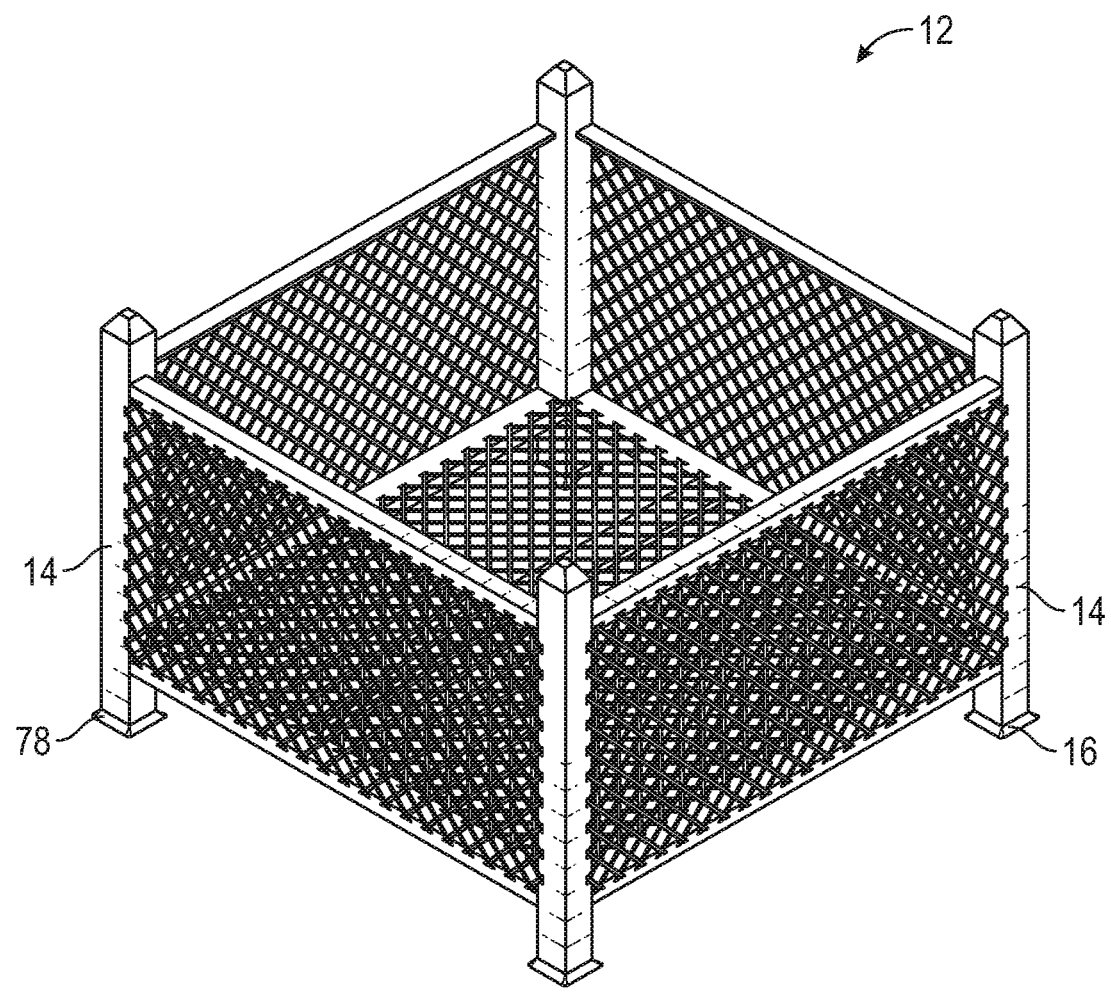
FIG. 1A is a perspective view of an exemplary object, in this case a basket, that may be used with the caster adapter.

The leg 14 of the object 12 may be provided with a leg protrusion 78 along a portion of the leg 14, such as the flare that is shown at the base 16 of the leg 14 of the object 12 depicted in FIG. 1A. A back panel leg conforming portion 74 may be utilized to accommodate a leg protrusion 78 along a portion of the subject leg 14 that will be placed, either fully or partially, within the interior 32 of the adapter member 40. The illustrated leg protrusion 78 is shown at the base 16 of the leg; therefore, the subject leg conforming portion 74 of the back panel 64 is located proximate the bottom surface 68 of the back panel 64. Accordingly, the leg conforming portion 74 of the back panel 64 may be located at various positions along the length of the back panel 64, wherein the position of the leg conforming portion 74 will be formed proximate the corresponding leg protrusion 78 on the subject leg 14.

The depicted back panel leg conforming portion 74 is curved outward proximate the bottom surface 68 of the back panel 64 in relation to the upper portion of the back panel 64, which allows the back panel leg conforming portion 74 to at least partially accommodate the flare at the base 16 of the object 12 in FIG. 1A. The leg conforming portion 74 may be positioned at other areas along the length of the back panel 64. The position of the leg conforming portion 74, when used, will be dependent on the position of the leg protrusion 78 along the length of the leg 14. The leg conforming portion 74 will aid in allowing the object 12 to be lifted while the caster adapters 10 are installed on the legs 14 thereof such that the interaction between the leg conforming portion 74, and in general the leg conforming portion 34 of the adapter member 40, will interact with the leg protrusion 78 to retain the caster adapter 10 on the leg 14 of the object 12 while the object is lifted off the ground.

In an alternative embodiment, the back panel 64 does not contain a leg conforming portion 74. In this alternative, the whole of the interior 32 of the adapter member 40 is large enough to accommodate the leg 14 of the object 12, including the width of any leg protrusion 78 that may be contained thereon proximate the interior 32 of the adapter member 40. Alternatively, the leg 14 of the object 12 may not have a leg protrusion 78 such that the interior 32 of the adapter member 40 is large enough to accommodate the leg 14. Alternatively, the leg 14 may or may not have a leg protrusion 78, yet the leg only partially extends within the interior 32 of the adapter member 40 such that the leg 14 is retained at least partially within the interior 32 of the adapter member 40 through the use of one or more containment members 80 or the object 12, when pushed by a user, is pushed such that the opening 30 in the adapter member 40 is positioned on the back of the leg 14 such that the force is directed away from the opening 30.

In an alternative embodiment, the adapter member 40 may be formed of only back panels 64, for illustration purposes the total number may be four back panels 64, wherein the coupled back panels 64 are all attached to the connecting base 38 proximate their respective bottom surfaces 68 and are attached to each other through connection of the various side surfaces 72 and 73 such that the panels form a partial cube with an insertion point for the leg 14 along the upper rim 128 of the adapter member 40 proximate the top surfaces 66 of the back panels 64. The combined back panels 64 define the interior 32 of the adapter member 40. This alternative configuration would not require a containment member 40 as the four back panels 64 would engulf the whole of the interior 32 without the need for an opening 30 along a side of the adapter member 40. At least a portion of the legs 14 of the object may be placed into the interior 32 of the respective adapter members 40 through the upper rim 128 of each respective adapter member 40. The object 12 would them be movable through the use of the coupled caster assemblies 20. In the alternative embodiment the back panels 64 may or may not have the back panel leg conforming portion 74.

Referring to FIGS. 3A, 3B, 3C, 5A and 5B, a first side panel 44 is shown. The first side panel 44 has a top surface 46, an opposite bottom surface 48, a first side surface 50 and a opposite second side surface 52. The bottom surface 48 connects to the connecting base 38 of the adapter member 40. The first side panel 44 is capable of coupling with additional panels 44, 54, and/or 64 along its first side surface 50 or second side surface 52 in order to form a complete adapter member 40 in a configuration suitable for attaching to the subject leg 14.

The first side panel 44 has at least one first side panel containment member orifice 130 extending therethrough proximate its second side surface 52. The first side panel containment member orifice 130 is capable of accepting at least a portion of a containment member 80 therethrough. The depicted first side panel 44 contains two first side panel containment member orifices 130, both orifices 130 being located proximate the first side panel's 44 second side surface 52; however, the orifices 130 may be located proximate any unattached side surface 50 or 52.

A first side panel leg conforming portion 53 may be utilized to accommodate a leg protrusion 78 along a portion of the subject leg 14 that will be placed, either fully or partially, within the interior 32 of the adapter member 40. The illustrated leg protrusion 78 is shown at the base 16 of the leg; therefore, the subject first side panel leg conforming portion 53 is located proximate the bottom surface 48 of the first side panel 44. Accordingly, the first side panel leg conforming portion 53 may be located at various positions along the length of the first side panel 44, wherein the position of the first side panel leg conforming portion 53 will be formed proximate the corresponding leg protrusion 78 on the subject leg 14.

The depicted first side panel leg conforming portion 53 is curved outward proximate the bottom surface 48 of the first side panel 44 in relation to the upper portion of the first side panel 44, which allows the first side panel leg conforming portion 53 to at least partially accommodate the flare at the base 16 of the object 12 in FIG. 1A. The first side panel leg conforming portion 53 may be positioned at other areas along the length of the first side panel 44, such as proximate the upper rim 128 of the adapter member 40 or anywhere intermediate the connecting base 38 and the upper rim 128 of the adapter member 40. The position of the first side panel leg conforming portion 53, when used, will be dependent on the position of the leg protrusion 78 along the length of the leg 14. The first side panel leg conforming portion 53 will aid in allowing the object 12 to be lifted while the caster adapters 10 are installed on the legs 14 thereof such that the interaction between the first side panel leg conforming portion 53, and in general the leg conforming portion 34 of the adapter member 40, will interact with the leg protrusion 78 to retain the caster adapter 10 on the leg 14 of the object 12 while the object is lifted off the ground.

In an alternative embodiment, the first side panel 44 does not contain a leg conforming portion 53. In this alternative, the whole of the interior 32 of the adapter member 40 is large enough to accommodate the leg 14 of the object 12, including the width of any leg protrusion 78 that may be contained thereon proximate the interior 32 of the adapter member 40. Alternatively, the leg 14 of the object 12 may not have a leg protrusion 78 such that the interior 32 of the adapter member 40 is large enough to accommodate the leg 14. Alternatively, the leg 14 may or may not have a leg protrusion 78, yet the leg only partially extends within the interior 32 of the adapter member 40 such that the leg 14 is retained at least partially within the interior 32 of the adapter member 40 through the use of one or more containment members 80 or the object 12, when pushed by a user, is pushed such that the opening 30 in the adapter member 40 is positioned on the back of the leg 14 such that the force is directed away from the opening 30.

Figure 5A:
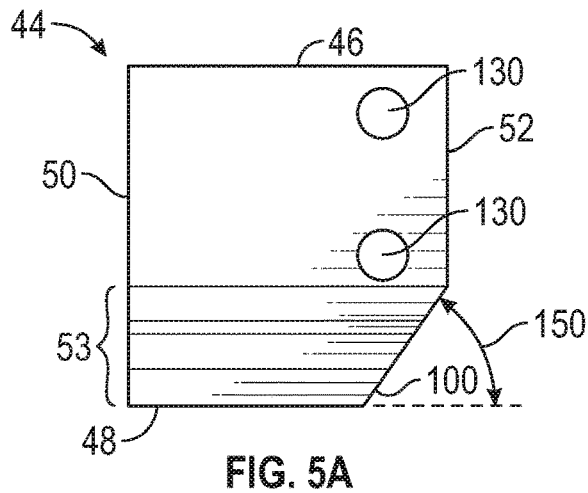
FIG. 5A is a front view of an exemplary first side panel.
Figure 5B:
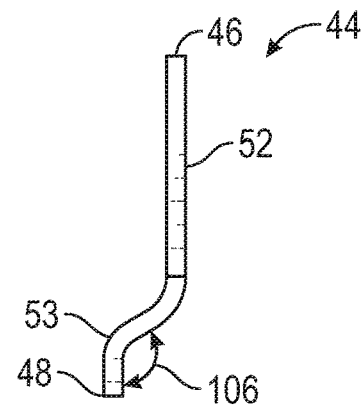
FIG. 5B is a side view of the exemplary first side panel of FIG. 5A.

The first side panel 44 of the depicted exemplary embodiment in FIGS. 5A and 5B contains a taper 100 along a portion of the second side surface 52, proximate the bottom surface 48. The taper 100 is angled 150 in relation to the plane of the bottom surface 48. An exemplary range of angle 150 is from about 5 degrees to about 85 degrees. A preferred range of angle 150 is from about 20 degrees to about 75 degrees. An even more preferred range of angle 150 is from about 40 degrees to about 70 degrees. An exemplary angle 150 is 55 degrees, as is shown in FIG. 5A.

A taper 100 on the first side panel 44 is not required and the adapter member 40 may be formed utilizing one or more first side panels 44 without the use of the taper 100. When utilized, the taper 100 may aid in sliding the leg 14 through the opening 30 in the side of the adapter member 40 by allowing for more room around the entrance to the opening 30 for the leg protrusion 78 of the leg 14. This additional space may facilitate the installation of the leg 14 into the caster adapter 10. Additionally, depending on the type of fastener 18 used the taper 100 may aid in providing more space around one or more fasteners 18 to provide for more efficient and/or easier installation of the leg 14 into the caster adapter 10. Further, depending on the size and shape of the connecting base 38 in relation to the adapter member 40, the taper 100 may aid in allowing adequate room for the fasteners 18 to be fastened to the connecting base 38 when the fasteners 18 are placed in close proximity to a portion of the adapter member 40.

The second side panel 54, shown in FIGS. 3A, 3B, 3C, 6A, and 6B, has a top surface 56, an opposite bottom surface 58, a first side surface 60 and an opposite second side surface 62. The bottom surface 58 connects to the connecting base 38 of the adapter member 40. The second side panel 54 is capable of coupling with additional panels 44, 54, and/or 64 along its first side surface 60 or second side surface 62 in order to form a complete adapter member 40 in a configuration suitable for attaching to the subject leg 14.

The second side panel 54 has at least one second side panel containment member orifices 132 extending therethrough proximate its second side surface 62. The second side panel containment member orifice 132 is capable of accepting at least a portion of a containment member 80 therethrough. The depicted second side panel 54 contains two second side panel containment member orifices 132, both orifices 132 being located proximate the second side panel's 54 second side surface 62; however, the orifices 132 may be located proximate any unattached side surface 60 or 62.

A second side panel leg conforming portion 63 may be utilized to accommodate a leg protrusion 78 along a portion of the subject leg 14 that will be placed, either fully or partially, within the interior 32 of the adapter member 40. The illustrated leg protrusion 78 is shown at the base 16 of the leg; therefore, the subject second side panel leg conforming portion 63 is located proximate the bottom surface 58 of the second side panel 54. Accordingly, the second side panel leg conforming portion 63 may be located at various positions along the length of the second side panel 54, wherein the position of the second side panel leg conforming portion 63 will be formed proximate the corresponding leg protrusion 78 on the subject leg 14.

The depicted second side panel leg conforming portion 63 is curved outward proximate the bottom surface 58 of the second side panel 54 in relation to the upper portion of the second side panel 54, which allows the second side panel leg conforming portion 63 to at least partially accommodate the flare at the base 16 of the object 12 in FIG. 1A. The second side panel leg conforming portion 63 may be positioned at other areas along the length of the second side panel 54, such as proximate the upper rim 128 of the adapter member 40 or anywhere intermediate the connecting base 38 and the upper rim 128 of the adapter member 40. The position of the second side panel leg conforming portion 63, when used, will be dependent on the position of the leg protrusion 78 along the length of the leg 14. The second side panel leg conforming portion 63 will aid in allowing the object 12 to be lifted while the caster adapters 10 are installed on the legs 14 thereof such that the interaction between the second side panel leg conforming portion 63, and in general the leg conforming portion 34 of the adapter member 40, will interact with the leg protrusion 78 to retain the caster adapter 10 on the leg 14 of the object 12 while the object is lifted off the ground.

In an alternative embodiment, the second side panel 54 does not contain a leg conforming portion 53. In this alternative, the whole of the interior 32 of the adapter member 40 is large enough to accommodate the leg 14 of the object 12, including the width of any leg protrusion 78 that may be contained thereon proximate the interior 32 of the adapter member 40. Alternatively, the leg 14 of the object 12 may not have a leg protrusion 78 such that the interior 32 of the adapter member 40 is large enough to accommodate the leg 14. Alternatively, the leg 14 may or may not have a leg protrusion 78, yet the leg only partially extends within the interior 32 of the adapter member 40 such that the leg 14 is retained at least partially within the interior 32 of the adapter member 40 through the use of one or more containment members 80 or the object 12, when pushed by a user, is pushed such that the opening 30 in the adapter member 40 is positioned on the back of the leg 14 such that the force is directed away from the opening 30.

The second side panel 54 of the depicted exemplary embodiment in FIGS. 6A and 6B contains a taper 102 along a portion of the second side surface 62, proximate the bottom surface 58. The taper 102 is angled 152 in relation to the plane of the bottom surface 58. An exemplary range of angle 152 is from about 5 degrees to about 85 degrees. A preferred range of angle 152 is from about 20 degrees to about 75 degrees. An even more preferred range of angle 152 is from about 40 degrees to about 70 degrees. An exemplary angle 152 is 55 degrees, as is shown in FIG. 6A.

A taper 102 on the second side panel 54 is not required and the adapter member 40 may be formed utilizing one or more second side panels 54 without the use of the taper 102. When utilized, the taper 102 may aid in sliding the leg 14 through the opening 30 in the side of the adapter member 40 by allowing for more room around the entrance to the opening 30 for the leg protrusion 78 of the leg 14. This additional space may facilitate the installation of the leg 14 into the caster adapter 10. Additionally, depending on the type of fastener 18 used the taper 102 may aid in providing more space around one or more fasteners 18 to provide for more efficient and/or easier installation of the leg 14 into the caster adapter 10. Further, depending on the size and shape of the connecting base 38 in relation to the adapter member 40, the taper 102 may aid in allowing adequate room for the fasteners 18 to be fastened to the connecting base 38 when the fasteners 18 are placed in close proximity to a portion of the adapter member 40.

Figure 3B:
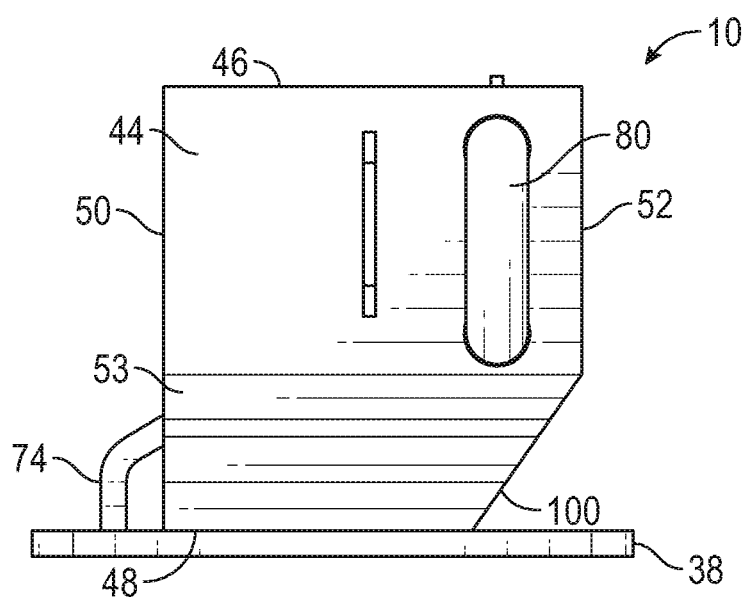
FIG. 3B is a side view of the exemplary embodiment of FIG. 3A.
Figure 3C:
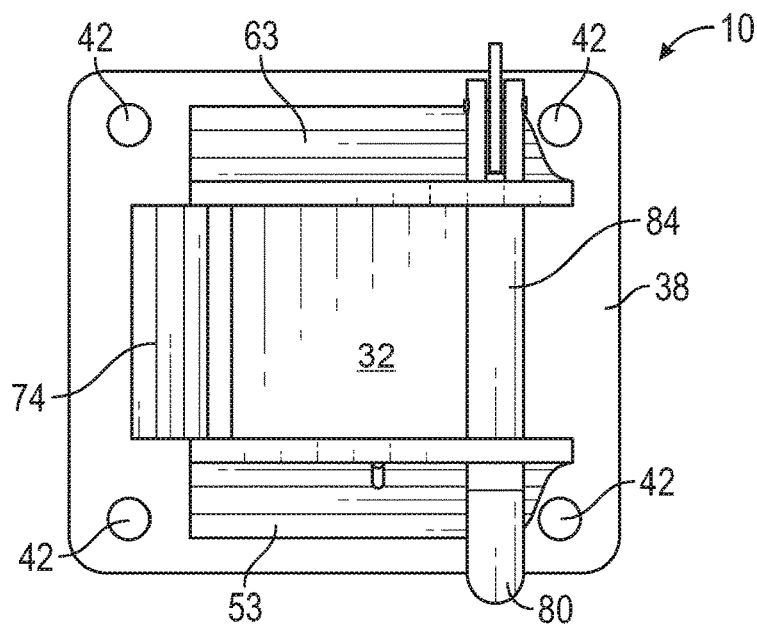
FIG. 3C is a top view of the exemplary embodiment of FIG. 3A.
Figure 4A:
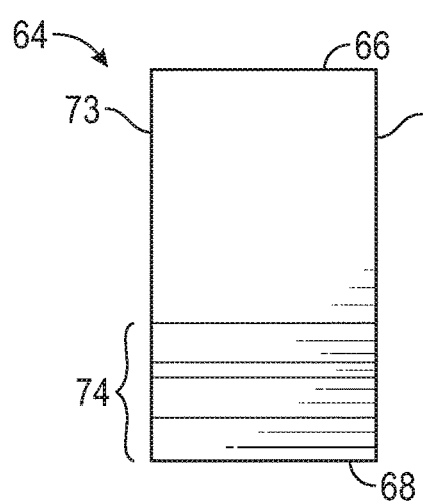
FIG. 4A is a front view of an exemplary back panel.
Figure 4B:
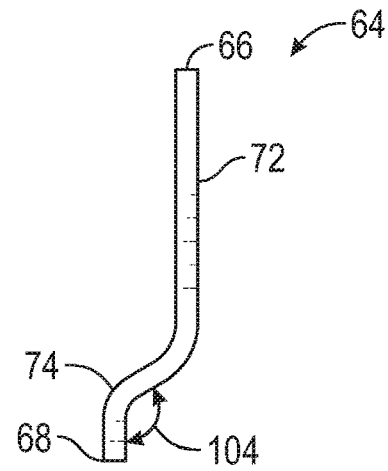
FIG. 4B is a side view of the exemplary back panel of FIG. 4A.

Referring to FIGS. 3A, 3B, and 3C, the back panel 64, first side panel 44, and second side panel 54 are each connected to the connecting base 38 of the caster adapter 10 at their respective bottom surfaces 68, 48, 58. One or more of the aforementioned connections may be temporary and/or reversible. The back panel 64 is positioned intermediate the first side panel 44 and the second side panel 54. The back panel 64 is attached to the first side panel 44 along at least a portion of its first side surface 72 proximate the first side surface 50 of the first side panel 44. The back panel 64 is attached to the second side panel 54 along at least a portion of its second side surface 73 proximate the first side surface 60 of the second side panel 54. Any of the aforementioned attachments may be removable such that an alternate panel may be installed as needed.

At least two panels 44, 54, and/or 64 are each positioned such that their respective leg conforming portions 53, 63, and/or 74 are each protruding outwardly away from the center of the adapter member 40. In this configuration, the leg 14 of the object 12 may be inserted into the interior of the adapter member 40 such that at least a portion of the flare of the leg 14 sits within one or more of the leg conforming portions 74, 53, and/or 63.

Referring to FIGS. 3A, 3B, 3C, 5A, 6A, 7A, 7B, 7C, 7D, and 7E, a containment member 80 is positioned along at least a portion of the adapter member 40, preferably proximate the opening 30 that is located in a side of the adapter member 40. The purpose of the containment member 80 is to prevent at least a part of the leg 14 of the object 12 within the interior 32 of the adapter member 40 from slipping out of the adapter member 40. The containment member 80 may also serve to contain the caster adapter onto at least a portion of the leg 14 of the object 12.

The exemplary containment member 80 shown is a generally U-shaped member having two locking arms 84 and 86 connectable at their respective locking arm coupling ends 146 and 148 to the containment member base 126, wherein at least one of the ends of its locking arms 84 and/or 86 had a slit 140 extending through a portion of the arm 84 or 86 proximate its free end 134 or 138. A retainment member 82 is coupled to at least one of the locking arms 84 or 86 of the containment member 80 at the slit 140, such that the retainment member 82 is moveable in relation to the locking arm 84 or 86.

Referring to FIGS. 7A and 7B, the retainment member 82 is placed in its insertion position 88 (shown in FIG. 7B) wherein the length of the retainment member 82 extends substantially parallel to the length of the subject arm 84 or 86 (the retainment member 82 is shown coupled to a first locking arm 84) in order for the containment member 80 to be inserted through one or more side panel containment member orifices 130 or 132. The retainment member 82 generally has its longitudinal axis aligned with the longitudinal axis of the subject locking arm 84 and/or 86 that it is coupled to while it is in its insertion position 88. While there may be some play on the aforementioned alignment outside of the following range, an exemplary insertion position alignment angle 92 range of the retainment member 82 in its insertion position 88 with relation to the subject locking arm 84 and/or 86 may be in the range of about 165 degrees to about 195 degrees, with the preferred insertion position alignment angle 92 range being about 175 degrees to about 185 degrees. The preferred insertion position alignment angle 92 is 180 degrees. FIG. 7B shows the retainment member 82 coupled to the first locking arm 84 and positioned in an exemplary insertion position 88 of 180 degrees.

The retainment member 82 is movable between its insertion position 88 and its locking position 90. The retainment member 82 is angled in relation to the longitudinal axis of the subject locking arm 84 and/or 86 that the retainment member 82 is coupled to at a locking position angle 94. While there may be some play on the aforementioned angle outside of the following range, an exemplary locking position angle 94 is in the range of about 15 degrees to about 140 degrees, with the preferred locking position angle 94 range being about 50 degrees to about 90 degrees. The preferred locking position angle 94 is 60 degrees. FIG. 7A shows the retainment member 82 coupled to the first locking arm 84 and positioned in an exemplary locking position 90 of 60 degrees.

The retainment member 82 is movably coupled to at least one locking arm 84 and/or 86 at slit 140. The subject locking arm 84 and/or 86, as depicted the first locking arm 84, has a locking arm coupling orifice 142 extending through the entirety of the subject locking arm 84 along a portion of the slit 140. The retainment member 82 has a corresponding retainment member coupling orifice extending therethrough. The retainment member 82 may be coupled to the subject locking arm 84 and/or 86 by connecting the aforementioned via the locking arm coupling orifice 142 and the corresponding retainment member coupling orifice such that the retainment member 82 will be movable in relation to the locking arm 84 and/or 86. This connection may be accomplished by utilizing a rivet to extend within the locking arm coupling orifice 142 and the retainment member coupling orifice to functionally couple the retainment member 82 and subject locking arm 84.

In an exemplary embodiment, as depicted, at least a portion of the retainment member 82 is positioned within the slit 140 of the subject locking arm 84 and/or 86 wherein the retainment member coupling orifice 144 is proximate the locking arm coupling orifice 142. A rivet 96, or similar device, may be inserted through the locking arm coupling orifice 142 and the retainment member coupling orifice thereby movably coupling the retainment member 82 to the subject first locking arm 84 (as depicted) and/or the second locking arm 86 as the case may be.

The retainment member 82 may be moveably coupled to at least one of the locking arms 84 and/or 86 by any other coupling mechanism in alternative embodiments so long as the retainment member 82 is moveable in relation to the locking arm 84 and/or 86 that it is coupled to once it is attached. Therefore, the moveable coupling of the retainment member 82 and at least one locking arm 84 and/or 86 may be accomplished by any now known or later discovered manner.

The retainment member 82 has a leading edge 114 and a non-leading edge 116. In an exemplary embodiment, the leading edge 114 is curved. The curve in the leading edge 114 may aid in inserting the retainment member 82 through one or more side panel containment member orifices 130 and/or 132. In an alternative embodiment, the non-leading edge 116 is substantially flat across.

In the exemplary embodiment shown, the non-leading edge 116 is slightly angled at a non-leading edge angle 118 in relation to the transverse axis 120 of the retainment member 82. The retainment member 82 is shown coupled to the first locking arm 84. A beveled 110 internal surface is formed along a surface of the first locking arm 84 forming the end of the slip 140 within the first locking arm 84. The beveled surface 110 is placed at an internal arm angle 122. In the exemplary embodiment depicted, the internal arm angle 122 may roughly correspond to the non-leading edge angle 118 such that at least a portion of the non-leading edge 116 of the retainment member 82 may at least partially rest along a portion of the beveled internal surface 110 of the first locking arm 84. The beveled internal surface 110 acts as a stopper to prohibit further lateral movement of the retainment member 82 once the retainment member 82 is manipulated into its insertion position 88. This angling 118 and 122 allows for the leading edge 114 of the retainment member 82 to be placed at the desired position, that is at the desired insertion position alignment angle 92, in relation to the relevant locking arm 84 and/or 86 for insertion of the locking arms 84 and/or 86 through the side panel leg containment member orifices 130 and/or 132.

The non-leading edge angle 118 may range from about 5 degrees to about 80 degrees. Preferably, the non-leading edge angle 118 ranges from about 5 degrees to about 25 degrees. More preferably, the non-leading edge angle 118 ranges from about 10 degrees to 20 degrees. The non-leading edge angle 118 shown in FIG. 7A is 15 degrees.

Figure 7C:
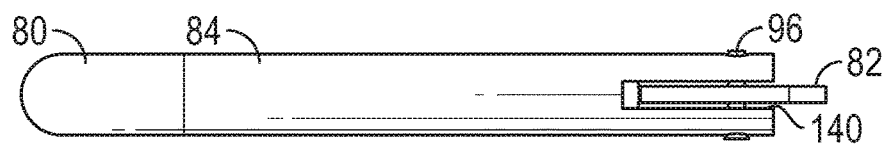
FIG. 7C is a top view of the containment member of FIG. 7A.
Figure 7D:
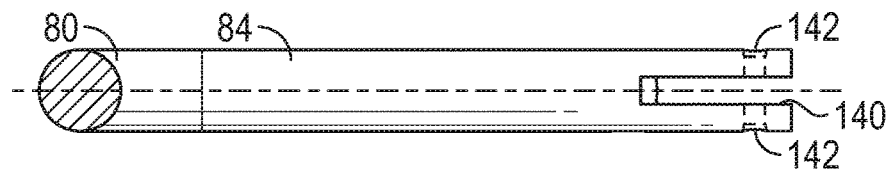
FIG. 7D is a cross-sectional view of FIG. 7C, through the first locking arm, without the retainment member or rivet coupled thereto.
Figure 7E:
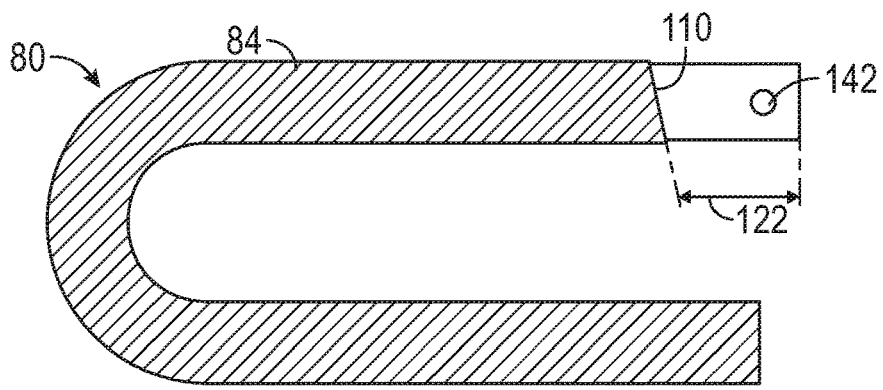
FIG. 7E is a cross-sectional view of the retainment member of FIG. 7A without the retainment member or rivet coupled thereto.

The internal arm angle 122 may range from about 5 degrees to about 90 degrees. Preferably, the internal arm angle 122 ranges from about 7 degrees to about 45 degrees. More preferably, the internal arm angle 122 ranges from about 7 degrees to about 30 degrees. The internal arm angle 122 shown in FIG. 7E is 12 degrees.

The first side panel containment member orifices 130 and the second side panel containment member orifices 132 substantially correspond when the panels 44 and 54 are installed on the connecting base 38 to allow for a containment member 80 to be retained along same through the use of the orifices 130 and 132. In use, after the leg 14 of the object 12 is inserted at least partially into the interior 32 of the adapter member 40, the containment member 80 is inserted into either the first side panel containment member orifices 130 or the second side panel containment member orifices 132, and is slid through to the remaining side panel containment member orifices 130 or 132. Once the containment member 80 is in place, the retainment member 82 is allowed to drop into its locking position 90. The retainment member 80 depicted in FIGS. 7A and 7B drops to its locking position 90 through the effect of gravity working on the retainment member 80. The retainment member 80 is freely movable along the rivet 95 that extends through its coupling orifice 144, which orifice 144 corresponds to the locking arm coupling orifice 142.

When only two panels 44 and 54 are utilized, they may be installed opposite each other on the connecting base 38 of the caster adapter 10, with at least one, but preferably two, containment members 80 extending therebetween to contain the leg 14 of the object 12 therewithin. When two containment members 80 are utilized with the configuration of the two panels 44 and 54 installed opposite each other on the connecting base 38, two openings 30 are created along each side of the installed panels 44 and 54. In this situation, a containment member 80 may be positioned along each opening 30 created by the installation of the panels 44 and 54 thereby enclosing each opening 30 in the adapter member 40 when the caster adapter 10 is installed on an object 12. At least one containment member 80 may be removed in order to insert or remove the leg 14 of the object 12 from within the adapter member 40. Alternatively, depending on the configuration of the leg 14, the two panels 44 and 54 may be connected along the respective first side surfaces 50 and 60 forming a triangular shape and having one opening 30 extending therebetween intermediate the respective unattached second side surfaces 52 and 62. At least one containment member 80 may be installed along the opening 30 to retain the leg 14 at least partially within the interior 32 of the adapter member 40.

In an alternative embodiment, the adapter member 40 may have a substantially triangular shape whereby only two panels 44, 54, and/or 64 and one containment member 80 are utilized. The sides 50 and 60 of the two panels 44 and 54 would abut and extend in a triangular shape back along the connecting base 38. A connecting member 80 may be inserted along sides 52 and 62 in order to contain the leg 14 of the object 12 therein. In further alternative embodiments having the at least two panels positioned and coupled to each other, more than one containment member 80 may be utilized and may also be coupled to each other. Further alternative embodiments may utilize more than three panels in order to allow the adapter member 40 to generally conform to the shape of the leg 14 of the object 12 to be moved in order to retain at least a portion of the leg 14 within the interior of the adapter member 40 as there is no specific uniform design for these types of objects 12. One skilled in the art, utilizing the teachings within this disclosure, will be able to manipulate the structure of the adapter member 40 in order to properly conform same to their needs in order to practice this invention.

Figure 10:
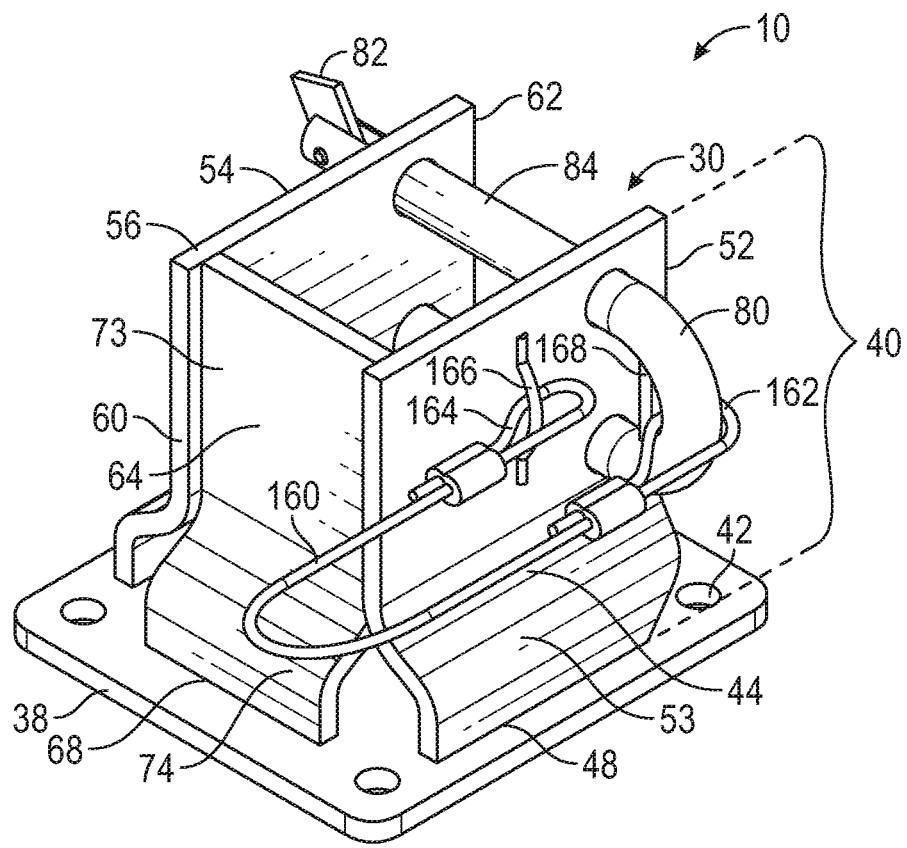
FIG. 10 is a perspective view of an alternative embodiment of the invention.
Figure 11:
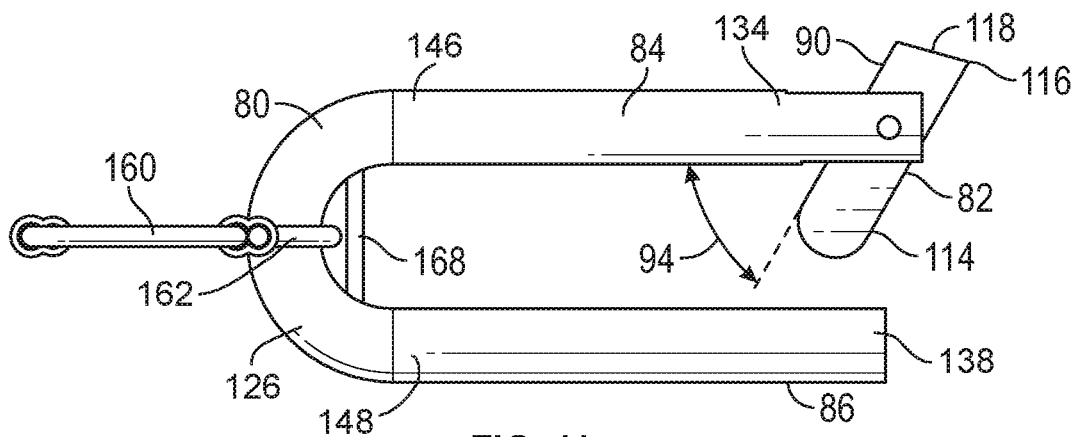
FIG. 11 is a front view of an alternative embodiment of the containment member.

Referring to FIGS. 3A, 10, and 11, an attachment member 160 may be coupled to the adapter member 40 and at least one containment member 80 such that the containment member 80 will be secured to the subject adapter member 40 even when the containment member 80 is not installed on the adapter member 40 proximate an opening 30. The attachment member 160, when coupled to both the adapter member 40 and a containment member 80, prevents misplacing the containment member 80 when not in its installed position and will aid in ensuring the containment member 80 will be readily available at the install location when the user is ready to secure the caster adapters 10 to the object 12.

The attachment member 160 may be coupled to the adapter member 40 through the use of an attachment member anchor 166 that is fixedly attached to at least one of the panels 44, 54, and/or 64. Ideally, the attachment member anchor 166 will be attached to a panel 44, 54, and/or 64 that contains at least one containment member orifice 130 and/or 132, such that the containment member 80, when coupled to the attachment member 160, will be secured proximate one or more containment member orifices 130 and/or 132. The interaction of the attachment member anchor 166 with the attachment location along the wall of the adapter member 40 forms an anchor aperture 170 which may be used to removably attach the attachment member 160 to the caster adapter 10.

The depicted exemplary embodiment of the attachment member 160 is an elongated wire rope having an adapter member securing end 164 at one end of the attachment member 160 and a containment member securing end 162 at the opposite end of the attachment member 160. The depicted adapter member securing end 164 is a loop to secure around the slightly raised portion of the attachment member anchor 166 that is attached on at least one side of the adapter member 40. Similarly, the depicted containment member securing end 162 is a loop which is capable of securing around a portion of the containment member 80.

The alternative embodiment of the containment member 80 (FIG. 11) that may be utilized with the attachment member 160 is a U-shaped member having a first locking arm 84 coupled at its base 126 to a second locking arm 86, wherein the locking arms 84 and 86 are positioned with a gap extending therebetween. The containment member 80 contains a containment member barrier 168 extending across the gap between the first locking arm 84 and second locking arm 86 proximate the base 126. When the containment member securing end 162 of the attachment member 160 is secured around the base 126 of the containment member 80, the containment member barrier 168 prevents the containment member securing end 162 from slipping off of the containment member 80 and dislodging from same. The purpose of the containment member barrier 168 is to retain the attachment member 160 on the containment member 80. When the containment member 80 is installed on the caster adapter 10 (referring to FIGS. 3A and 10), the containment member barrier 168 will sit external of the interior 32 of the adapter member 40.

The attachment member 160 depicted in the exemplary embodiment in FIG. 10 is removable from the caster adapter 10 and the containment member 80 for easy replacement of the attachment member 160 should the need or desire to replace same arise.

Alternatively, the containment member securing end 162 may extend through the body of the containment member 80 thereby securing the attachment member 160 thereto. In further alternative embodiments, alternative means may be employed to retain at least a portion of the attachment member 160 on a portion of the containment member 80 such that the attachment member 160 may retain the containment member in close proximity to the subject caster adapter 10. This may be done by any now known or later discovered manner.

In alternative embodiments, the attachment member 160 may be made of other materials other than wire rope. The purpose of the attachment member 160 is to physically retain the containment member 80 in close proximity to the caster adapter 10 so that a user may easily secure the caster adapter 10 onto a leg 14 of an object 12 without the risk of misplacing the containment member 80.

In alternative embodiments, one or both of the ends 162 and/or 164 or the attachment member 160 may be welded or otherwise fused to the caster adapter 10 and the containment member 80.

Alternative embodiments of the invention do not utilize the attachment member 160, attachment member anchor 166, and/or the containment member barrier 168, for example see FIGS. 1, 5A, 6A, 7A, 7B, and 8.

In alternative embodiments, the non-leading edge angle 118 and the internal arm angle 122 may be equal. In other alternative embodiments, one being shown in FIGS. 7D and 7E, the non-leading edge angle 118 and the internal arm angle 122 may differ. This is acceptable provided the purpose of preventing movement of the retainment member 82 past a desired point may be accomplished.

In alternative embodiments, more than one containment member 80 may be utilized either on the same side of the adapter member 40 or on different sides thereof. For example, an adapter member 40 may have side panels 44 and 54 positioned opposite each other wherein each side panel 44 and 54 have two sets of side panel containment member orifices 130 and 132 on each side panel 44 and 54. The first side panel 44 may have one set of side panel containment member orifices 130 proximate its first side surface 50, and the first side panel 44 may have its second set of side panel containment member orifices 130 proximate its second side surface 52. The second side panel 54 may have one set of side panel containment member orifices 132 proximate its first side surface 60, and the second side panel 54 may have its second set of side panel containment member orifices 132 proximate its second side surface 62. In this configuration, two containment members 40 may be utilized, with one containment member 40 extending at least partially through the side panel containment member orifices 130 and 132 located on the respective first side surfaces 50 and 60 of the side panels 44 and 54, and the second containment member 40 extending at least partially through the side panel containment member orifices 130 and 132 located on the respective second side surfaces 52 and 62 of the side panels 44 and 54. All embodiments of the invention should have at least one containment member 80.

In an alternative embodiment, the containment member 80 comprises one locking arm 84 or 86 having at least one slit 140 on one of its ends. This embodiment may have two retainment members 82, with each coupled to a respective end of the containment member 80. At least one of these retainment members 82 is moveable in relation to the locking arm 84 such that it may be manipulated to allow insertion of the locking arm 84 at least partially through a side panel containment orifice 130 and/or 132. The movement of the retainment member 82 may be accomplished by its moveable coupling with the locking arm 84 at slit 140. Both ends of the locking arm 84 may have retainment members 82 coupled thereto that are both moveable in relation to the locking arm 84. More than one locking arm 84 or 86 may be utilized per side of the adapter member 40.

In a further alternative embodiment, one end of the locking arm 84 may be larger than the other end thereby preventing passage of the larger end through either of the side panel containment member orifices 130 and/or 132. The larger end will prevent the locking arm 84 from passing completely through either side panel containment member orifice 130 and/or 132 thereby allowing the retainment member 82 to be retained on only one end, the non-larger end, of the locking arm 84. An attachment member 160 may be coupled to the locking arm 84 in order to retain the locking arm 84 in close proximity to the caster adapter 10. The containment member securing end 162 of the attachment member 160 may be inserted into the larger end of the locking arm 84 or otherwise secured to the larger end of the locking arm 84.

In an alternative embodiment, one or more of the at least two panels 44, 54, and/or 64 may be removable from the connecting base 38 of the caster adapter 10 and may be replaceable with alternative back panels 64, or side panels 44 and/or 54 as needed to conform the caster adapter 10 to the base 16 of each respective leg 14 of an object 12. One or more of the replaceable panels 44, 54, and/or 64 may have an alternative leg conforming portion 53, 63, and/or 74 variation.

In alternative embodiments, the first side panel leg conforming portion angle 106 may be between 0 and 180 degrees. In the exemplary embodiment shown in FIG. 5B, the first side panel leg conforming angle 106 is 120 degrees; however, it is understood that this angle may vary depending on the shape of the leg 14.

In alternative embodiments, the second side panel leg conforming portion angle 108 may be between 0 and 180 degrees. In the exemplary embodiment shown in FIG. 6B, the second side panel leg conforming portion angle 108 is 120 degrees; however, it is understood that this angle may vary depending on the shape of the leg 14.

A back panel leg conforming portion 74 is located proximate the bottom surface 68 of the back panel 64. The depicted back panel leg conforming portion 74 is curved outward, proximate the bottom surface 68 of the back panel 64, in relation to the upper portion of the back panel 64 to at least partially accommodate the flare at the base 16 of the object 12 in FIG. 1A. In alternative embodiments, the back panel leg conforming portion angle 104 may be between 0 and 180 degrees. In the exemplary embodiment depicted in FIG. 4B, the back panel leg conforming portion angle 104 is 120 degrees; however, it is understood that this angle 104 may vary depending on the shape of the leg 14.

Figure 8:
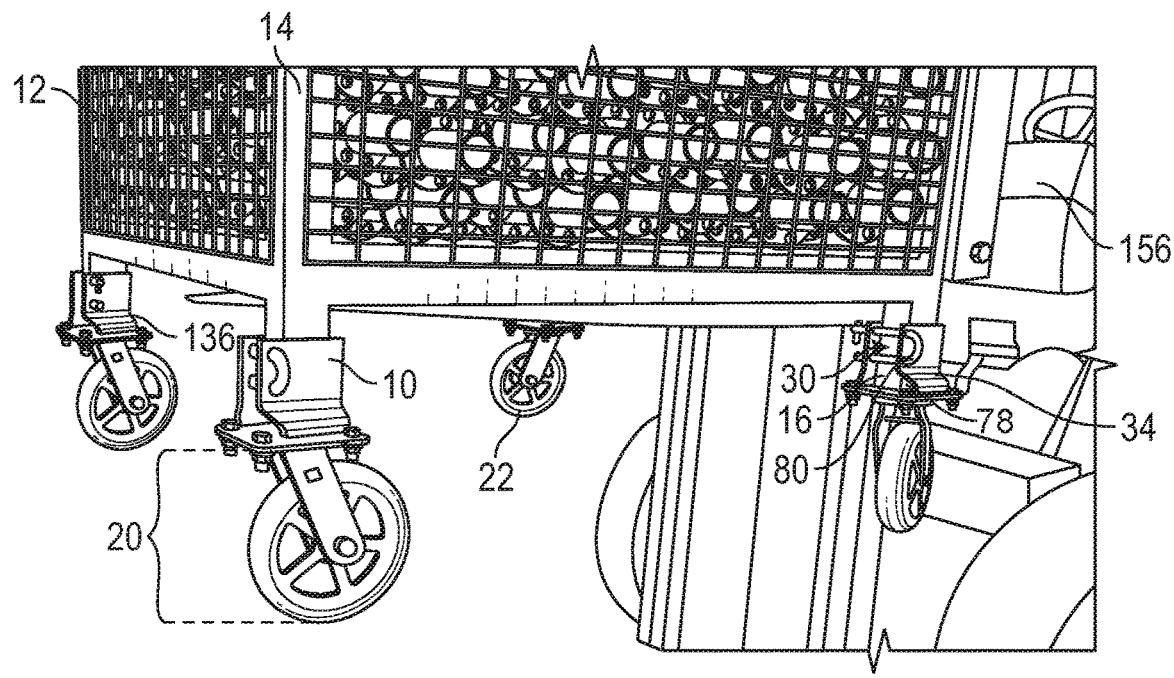
FIG. 8 is a perspective view of an object, having exemplary caster adapters installed thereon, being lifted by a forklift while retaining the caster adapters in position on the respective legs through interaction of the various leg conforming portions with the leg protrusions on each leg.

The leg conforming portions 53, 63, and 74 are utilized to expand some portion of the internal area of the adapter member 40. In alternative embodiments this area expansion of the adapter member 40 may be proximate the top surfaces 46, 56, and 66 of the panels 44, 54, 64 rather than the area proximate the bottom surfaces 48, 58, and 68 such that the leg conforming portions 53, 63, and 74 may be relocated proximate the top surfaces 46, 56, and 66. In further alternative embodiments, the area expansion of the adapter member 40 may encompass a greater amount of the panels 44, 54, and 64 such that the respective leg conforming portions 53, 63, and 74 may be at one location along the respective panels 44, 54, and 64, may be along substantially all of the respective panels 44, 54, and 64, and/or may occur intermittently along the respective panels 44, 54, and 64. It is possible for the leg conforming portions to arise intermittently along the length of the panels 44, 54, and 64 because the leg 14 may be slid into the interior of the adapter member 40 through the opening 30 and contained therein with the use of the containment member 80 rather than inserted into the adapter member 40 from the top. The purpose of the leg conforming portions 53, 63, and 74 are to allow for the enlargement of areas within the adapter member in order to accommodate areas along the leg 14 that will be placed within the adapter member 40 and that have varying widths or geometries, such as the flare that is shown in FIG. 1A. The area of larger surface area along the leg 14 also allows for interaction of the leg 14 with the areas proximate the leg conforming portions 53, 63, and 74 of the caster adapter 10 in order to retain the caster adapter onto the leg 14 when the object 12 is lifted, such as with a forklift as seen in FIG. 8.

In an alternative embodiment, the second side surface 52 of the first side panel 44 and the second side surface 62 of the second side panel 54 are tapered 100 and 102 inward proximate their respective bottom surfaces 48 and 58.

In the exemplary embodiment, shown in FIG. 5A, the taper 100 of the second side surface 52 of the first side panel 44 forms an angle 150 in relation to the plane of the bottom surface 48. An exemplary range of angle 150 is from about 5 degrees to about 85 degrees. A preferred range of angle 150 is from about 20 degrees to about 75 degrees. An even more preferred range of angle 150 is from about 40 degrees to about 70 degrees. An exemplary angle 150 is 55 degrees, as is shown in FIG. 5A.

In an exemplary alternative embodiment, shown in FIG. 6A, the taper 102 of the second side surface 62 of the second side panel 54 forms an angle 152 in relation to the plane of the bottom surface 58. An exemplary range of angle 152 is from about 5 degrees to about 85 degrees. A preferred range of angle 152 is from about 20 degrees to about 75 degrees. An even more preferred range of angle 152 is from about 40 degrees to about 70 degrees. An exemplary angle 152 is 55 degrees, as is shown in FIG. 6A.

Figure 9:
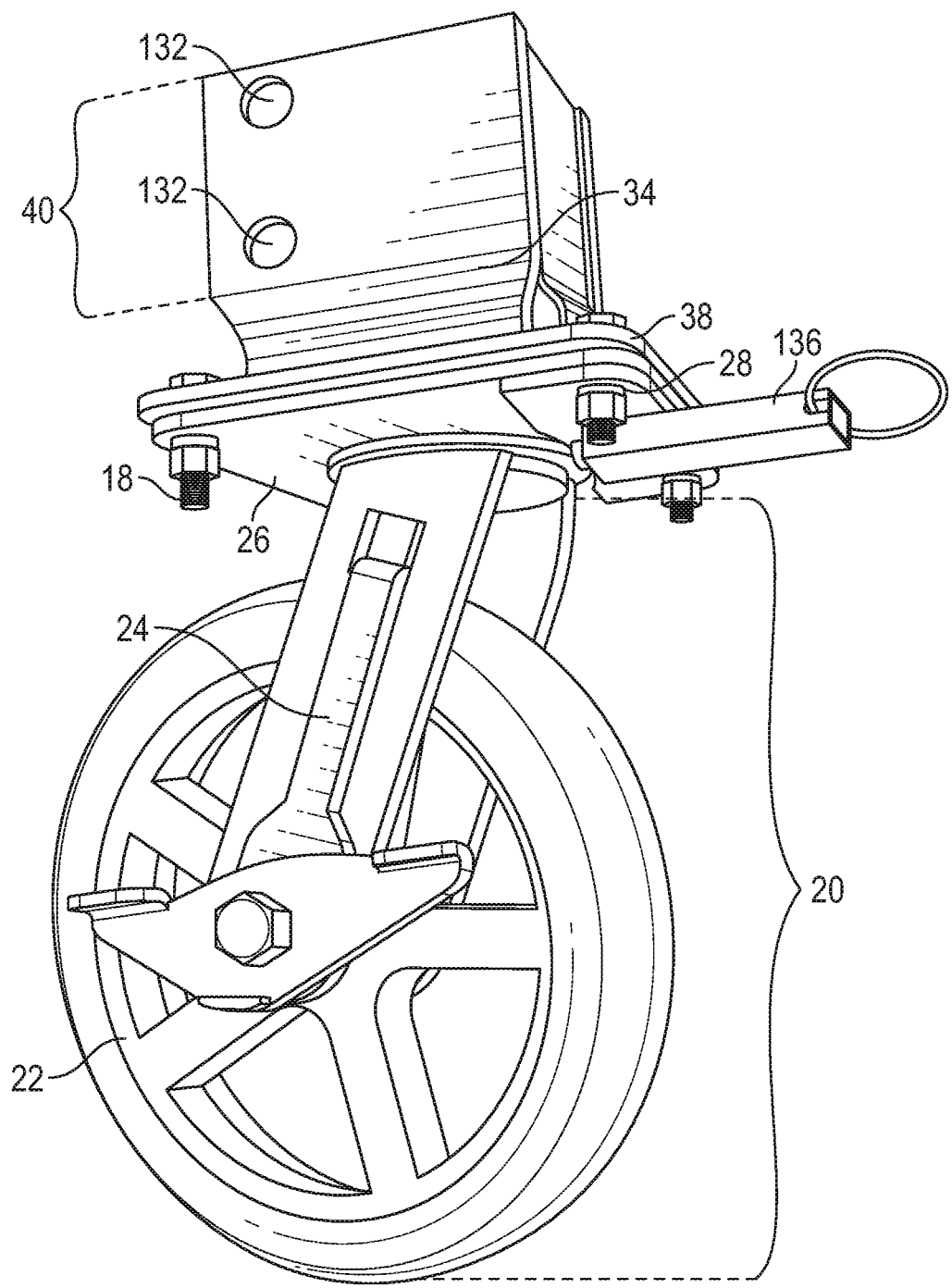
FIG. 9 is a perspective view of a caster having a swivel lock, wherein the caster has a caster adapter installed thereon.

Referring to FIG. 9, when the caster assembly 20 is of the type that swivels, a swivel lock 136 may be utilized in order to prevent the caster assembly 20 from swiveling. A swivel lock 136, as shown or any swivel lock 136 now known or later discovered, may be inserted into a receptor on the caster assembly 20 to prevent swiveling of same.

In operation, a caster adapter 10 providing step is performed wherein a caster adapter 10 is provided that is configured to fit at least partially around the leg 14 of an object 12. This step may include a measuring step wherein the leg 14 of an object 12 is measured such that an appropriate configuration of the adapter member 40 may be provided for use. In the event the leg 14 contains a leg protrusion 78, the measurement will allow for the use of at least two panels 44, 54, and/or 64 having appropriate leg conforming portions 53, 63, and/or 74 to fit over at least a portion of the leg protrusion 78 through the use of one or more leg conforming portions 34, 53, 62, and/or 74.

A coupling step comprising coupling the caster adapter 10 to the caster assembly 20 may be performed. The coupling of the caster adapter 10 to the caster assembly 20 may include the alignment of at least two connecting orifices 28 on the caster assembly 20 with at least two corresponding connection interfaces 42 on the caster adapter 10 such that the at least two connecting orifices 28 may be removably or permanently attached to the respective at least two connection interfaces 42. This attachment will couple the caster adapter 10 to the caster assembly 20 for use on an object 12.

In an exemplary embodiment of the coupling step, when a swivel lock 136 is not used, the step may include utilizing bolts, with respective washers and nuts, to couple the at least two connecting orifices 28 with their respective at least two connection interfaces 42. In an alternative embodiment of the coupling step, a bolt, with respective washer and nut, may be utilized in each pairing of the connecting orifices 28 with their respective connection interfaces 42 between the caster adapter 10 and the caster assembly 20. It may not be necessary to connect every paired connecting orifice 28 to its corresponding connection interface 42. Alternative coupling methods may be utilized such as clamping or welding the caster adapter 10 to the caster assembly 20.

In an exemplary embodiment of the coupling step, when a swivel lock 136 is used, at least one connecting orifice 28 will be attached to its respective connection interface 42 distal the location for the swivel lock 136, which will adequately hold the caster adapter 10 and caster assembly 20 in place in relation to each other so that the swivel lock 136 may be installed. The swivel lock 136 is then placed along the caster top plate 26 proximate the location where it will engage the connecting member 24 to prevent the swiveling of same, such that the coupling orifices of the swivel lock 136 may line up with the adjacent connecting orifices 28 on the caster top late 26. The coupling orifices of the swivel lock 136, and the adjacent connecting orifices 28 and connection interfaces 42 are attached at their respective connection locations such that the swivel lock 136 is coupled to the caster adapter 10 and the caster assembly 20 when fully assembled.

In an alternative embodiment, all the corresponding connecting orifices 28 and connection interfaces 42 are attached during the coupling step. In a further alternative embodiment, all the corresponding connecting orifices 28 and connection interfaces 42 are attached utilizing nuts with respective bolts and washers during the coupling step.

The coupling step may further comprise ensuring the that swivel locks 136 work properly by alternatively engaging and disengaging the swivel locks 136.

A replacing step may be performed whereby one or more of the panels 44, 54, and/or 64 may be removed from the caster adapter 10 and may be replaced with alternative panels 44, 54, and/or 64. The replacing step may be performed when the leg 14 of the object 12 is of a different proportion to one or more of the panels 44, 54, and/or 64 that are installed on the caster adapter in order to provide panels 44, 54, and/or 64 that adequately conform to the dimensions of the subject leg 14. One or more of the panels 44, 54, and/or 64 may be removably attachable to the connecting base 38 of the caster adapter 10.

An installing step is performed to install the caster adapters 10 onto the leg 14 of an object 12. The installing step may include the process of inserting a portion of the leg through the opening 30 and into at least a portion of the interior 32 of the adapter member 40. When the leg 14 contains a leg protrusion 78 that will at least partially be inserted into the adapter member 40, it is preferable that the leg 14 is slid into the adapter member 40 through an opening 30 rather than inserted into the adapter member 40 through the top or upper rim 128 of the adapter member 40. This will allow at least a portion of the leg protrusion 78 on the leg 14 to interact with at least a portion of the leg conforming portion 34 to aid in maintain the coupling of the leg 14 with the caster adapter 10 during movement and/or lifting of the object 12. The installing step may be repeated until the desired number of caster adapters 10 are installed on the various legs 14 of the object 12. It is understood that the caster adapters 10 do not necessarily need to be installed on every leg 14 of the object 12 in order for the object 12 to be movable as desired by the particular user.

When utilizing swivel locks 136 in the installing step, the caster adapters 10 having the swivel locks 136 coupled thereto should be installed on the various legs 14 of the same object 12 such that each utilized swivel lock 136 is installed parallel to the other installed swivel locks 136. In an exemplary embodiment (shown in FIG. 8) the installing step includes installing the caster adapters 10 having the swivel locks 136 such that they are parallel to each other and such that they will be parallel with the forks of a forklift 156 when the object 12 is lifted by same, and/or such that the casters will face the same direction to allow for smoother movement of the object 12. This configuration will avoid damage to the caster assemblies 20 that are coupled to the swivel locks 136.

In the installing step, when utilizing the swivel locks 136 on less than all of the caster assemblies 20, it is preferable that the caster adapters 10 that are coupled to the caster assemblies 20 having swivel locks 136 are not installed to legs 14 that are diagonal to each other in relation to the object 12.

It is also preferable, when utilizing the swivel locks 136 on less than all of the caster assemblies 20, to install the caster adapters 10 that are coupled to caster assemblies 20 having swivel locks 136 on the legs 14 of the object 12 that will be distal the forklift 156 when in operation.

A retaining step aids in retaining the leg 14 within at least a portion of the caster adapter 10, preferably within at least a portion of the adapter member 40. The retaining step includes coupling at least one containment member 80 with the adapter member 40. The coupling of the at least one containment member 80 with the adapter member 40 may be through the attachment, wherein the attachment may be temporary, of at least one containment member 80 between a pair of adjacent panels 44, 54, and/or 64. The retaining step may comprise the use of more than one containment member 80. The retaining step may utilize one or more attachment members 160 coupled at its containment member securing end 162 to at least one containment member 80 and at its adapter member securing end 164 to the adapter member 40 of the caster adapter 10.

An attaching step may be utilized to attach the attachment member 160 to the caster adapter 10 and at least one containment member 80. The attaching step may include fastening the loop of the containment member securing end 162, when a loop is used, to the locking arm 84 and/or the base 126 of the containment member 80, or otherwise securing the containment member securing end 162 to the containment member 80, either removably or permanently. Likewise, the attaching step may include fastening the loop of the adapter member securing end 164, when a loop is used, to the adapter member 40 and/or the attachment member anchor 166 that may be attached to the adapter member 40, or otherwise securing the adapter member securing end 164 to the adapter member, either removably or permanently.

A moving step of moving the object may include the use of a forklift 156 (FIG. 8). It is preferable, when utilizing the swivel locks 136 on less than all of the caster assemblies 20, that the forklift 156 pick up the object 12 on a side that does not have the swivel locks 136 installed. This will position the caster adapters 10 that are coupled to swivel locks 136 in front of the object 12 in relation to the forklift 156, if the position of the forklift 156 is considered to be the back of the object 12.

A moving step may include moving the object 12 utilizing manpower by pushing the object 12 from one location to another.

The depicted exemplary embodiments may be altered in a number of ways while retaining the inventive aspect, including ways not specifically disclosed herein.

Throughout the description and claims of this specification, the words "comprise" and "contain" and variations of the words, for example "comprising" and "comprises", means "including but not limited to", and is not intended to (and does not) exclude other moieties, additives, components, integers or steps.

Throughout the description and claims of this specification, the singular encompasses the plural unless the context otherwise requires. In particular, where the indefinite article is used, the specification is to be understood as contemplating plurality as well as singularity, unless the context requires otherwise.

Features and characteristics described in conjunction with a particular aspect, embodiment or example of the invention are to be understood to be applicable to any other aspect, embodiment or example described herein unless incompatible therewith.

All of the features disclosed in this specification (including any accompanying claims, abstract and drawings), and/or all of the steps of any method or process so disclosed, may be combined in any combination, except combinations where at least some of such features and/or steps are mutually exclusive. In other words, the method steps have not been provided for in any particular sequential order and may be rearranged as needed or desired, with some steps repeated sequentially or at other times, during use.

Each feature disclosed in this specification (including any accompanying claims, abstract and drawings), may be replaced by alternative features serving the same, equivalent, or similar purpose, unless expressly stated otherwise. Thus, unless expressly stated otherwise, each feature disclosed is one example only of a generic series of equivalent or similar features.

The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed.

I claim:

1. A caster adapter, comprising:
   an adapter member comprising at least two panels: a first panel and a second panel;
   wherein the first panel having a first panel top surface and a first panel bottom surface;
   wherein the second panel having a second panel top surface and a second panel bottom surface;
   a connecting base, wherein the adapter member is coupled to the connecting base proximate at least a portion of the first panel bottom surface and the second panel bottom surface;
   wherein the at least two panels define an interior of the adapter member;
   wherein at least one opening is formed in the adapter member between two panels; and
   a leg conforming portion extending along at least a portion of the adapter member, wherein the leg conforming portion protrudes away from the interior of the adapter member.

2. The caster adapter of claim 1, further comprising:
   the first panel of the adapter member having two side surfaces: a first panel first side surface and a first panel second side surface;
   the second panel of the adapter member having two side surfaces: a second panel first side surface and a second panel second side surface;
   the connecting base having at least one substantially flat face, wherein the first panel and the second panel of the adapter member are each coupled to the connecting base proximate the respective bottom surfaces of each panel, and wherein the first panel and the second panel are coupled together proximate the first panel first side surface and the second panel first side surface, wherein the first panel second side surface and the second panel second side surface are not connected, thereby defining one of the at least one openings in a side of the adapter member; and at least one containment member capable of extending across at least a portion of the opening.

3. The caster adapter of claim 1, further comprising:

the first panel of the adapter member having two side surfaces: a first panel first side surface and a first panel second side surface;

the second panel of the adapter member having two side surfaces: a second panel first side surface and a second panel second side surface;

wherein the first panel and the second panel are coupled to the connecting base proximate the respective bottom surfaces of each panel at opposite ends of the connecting base, wherein the first panel first side surface and second panel first side surface define one of the at least one openings in a side of the adapter member, and the first panel second side surface and the second panel second side surface define a second of the at least one openings in the opposite side of the adapter member; and at least one containment member coupled to the adapter member and extending across one of the openings.

4. The caster adapter of claim 3, further comprising:

a back panel having a back panel top surface, a back panel bottom surface, and a back panel first side surface and a back panel second side surface intermediate the back panel top surface and the back panel bottom surface;

the back panel coupled to the substantially flat face of the connecting base proximate the back panel bottom surface, intermediate the first panel and second panel;

wherein the back panel first side surface is attached proximate to the first panel first side surface, and the back panel second side surface is attached proximate to the second panel first side surface;

wherein one opening extends between the first panel and second panel adjacent the first panel second side surface and the second panel second side surface;

one of the at least one containment members having at least one generally elongated locking arm; and at least one first panel containment member orifice is disposed proximate the first panel second side surface, and at least one second panel containment member orifice is disposed proximate the second panel second side surface, wherein one of the first panel containment member orifices and one of the second panel containment member orifices are configured to accept at least part of the length of the containment member locking arm such that when installed the containment member locking arm will extend across the opening through the first panel containment member orifice and the second panel containment member orifice.

5. The caster adapter of claim 4, further comprising:

at least one retainment member having a leading edge and an opposite non-leading edge; and the at least one retainment member coupled to at least one end of one of the at least one locking arms of the containment member, wherein the coupled retainment member is movable between an insertion position and a locking position.

6. The caster adapter of claim 4, further comprising:

an elongated attachment member having a containment member securing end and an opposite adapter member securing end, wherein the attachment member is coupled to the adapter member at its adapter member securing end and coupled to at least one containment member at its containment member securing end;

at least one retainment member having a leading edge and an opposite non-leading edge; and the at least one retainment member coupled to at least one end of one of the at least one locking arms of the containment member, wherein the coupled retainment member is movable between an insertion position and a locking position.

7. The caster adapter of claim 6, further comprising:

wherein the leg conforming portion extends along at least a portion of the adapter member proximate the connecting base;

wherein the first panel has two first panel containment member orifices disposed proximate the first panel second side surface and wherein the second panel has two second panel containment member orifices disposed proximate the second panel second side surface;

one of the at least one containment members having two locking arms, a first locking arm and a second locking arm, wherein the first locking arm and the second locking arm each have a respective locking arm coupling end and a locking arm free end, wherein the two locking arms are coupled together at the respective locking arm coupling end of each locking arm; and wherein one of the at least one retainment members is coupled to the locking arm free end of the first locking arm.

8. The caster adapter of claim 7, further comprising:

a gap formed between the first locking arm and the second locking arm;

the first locking arm and the second locking arm are each generally circular and elongated;

the first locking arm and the second locking arm are each connected to a generally u-shaped containment member base at the respective locking arm coupling end of each locking arm;

a containment member barrier having two ends wherein the containment member barrier extends across the gap proximate the containment member base, with one end of the containment member barrier attaching to the containment member proximate the locking arm coupling end of the first locking arm and with the second end of the containment member barrier attaching to the containment member proximate the locking arm coupling end of the second locking arm;

an attachment member anchor protruding from the side of the adapter member, wherein the attachment member anchor defines an anchor aperture between the attachment member anchor and the side of the adapter member; and wherein the containment member securing end of the attachment member is looped around the containment member base such that the containment member barrier prevents the containment member securing end from traveling along the full length of the first locking arm or the second locking arm to the respective locking arm free end, and wherein the adapter member securing end of the attachment member is looped around the attachment member anchor.

9. A caster adapter, comprising:

an adapter member comprising three panels:

a back panel having a back panel top surface, a back panel bottom surface, a back panel first side surface and a back panel second side surface;

a first side panel having a first side panel top surface, a first side panel bottom surface, a first side panel first side surface, and a first side panel second side surface; and a second side panel having a second side panel top surface, a second side panel bottom surface, a second side panel first side surface, and a second side panel second side surface;

a connecting base having a substantially flat face, wherein the adapter member is coupled to the substantially flat face of the connecting base along at least a portion of the back panel bottom surface, the first side panel bottom surface, and the second side panel bottom surface;

wherein the back panel first side surface is attached proximate to the first side panel first side surface and the back panel second side surface is attached proximate to the second side panel first side surface;

wherein the back panel, first side panel, and second side panel combine to define the interior of the adapter member;

an opening is formed in a side of the adapter member between the first side panel second side surface and the second side panel second side surface;

a containment member having at least one elongated locking arm capable of extending across the opening in the adapter member when installed on the caster adapter, wherein the at least one locking arm having a locking arm coupling end and an opposite locking arm free end;

at least one retainment member; and the at least one retainment member coupled to the locking arm free end of the containment member, wherein the coupled retainment member is movable between an insertion position and a locking position.

10. The caster adapter of claim 9, wherein at least one of the back panel, first side panel, and second side panel is non-planar.

11. The caster adapter of claim 9, further comprising:
a leg conforming portion extending along at least a portion of the adapter member, wherein the leg conforming portion protrudes away from the interior of the adapter member;

at least one first side panel containment member orifice is disposed proximate the first side panel second side surface and at least one second side panel containment member orifice is disposed proximate the second side panel second side surface, wherein the at least one first side panel containment member orifice and the at least one second side panel containment member orifice are configured to accept at least part of the length of the at least one elongated locking arm of the containment member; and wherein the at least one elongated locking arm is generally cylindrical.

12. The caster adapter of claim 11, wherein the leg conforming portion is disposed proximate the connecting base and the leg conforming portion extends along a portion of the back panel, first side panel, and second side panel.

13. The caster adapter of claim 11, further comprising:
wherein the first side panel has two first side panel containment member orifices disposed proximate the first side panel second side surface and wherein the second side panel has two second side panel containment member orifices disposed proximate the second side panel second side surface;

wherein the containment member comprising two of the at least one locking arms, a first locking arm and a second locking arm;

wherein the first locking arm and the second locking arm each have a locking arm coupling end and a locking arm free end, wherein the two locking arms are connected to a generally u-shaped containment member base at the locking arm coupling end of each locking arm; and wherein one of the at least one retainment members is coupled to the locking arm free end of the first locking arm.

14. The caster adapter of claim 13, further comprising an elongated attachment member having a containment member securing end and an opposite adapter member securing end, wherein the containment member securing end of the attachment member is attached to the containment member, and wherein the adapter member securing end of the attachment member is attached to the adapter member of the caster adaptor.

15. The caster adapter of claim 14, further comprising:
a gap formed between the first locking arm and the second locking arm;

a containment member barrier having two ends wherein the containment member barrier extends across the gap proximate the containment member base, with one end of the containment member barrier attaching to the containment member proximate the locking arm coupling end of the first locking arm and with the second end of the containment member barrier attaching to the containment member proximate the locking arm coupling end of the second locking arm;

an attachment member anchor protruding from the side of the adapter member, wherein the attachment member anchor defines an anchor aperture between the attachment member anchor and the side of the adapter member; and wherein the containment member securing end of the attachment member is looped around the containment member base such that the containment member barrier prevents the containment member securing end from traveling along the full length of the first locking arm or the second locking arm to the respective locking arm free end, and wherein the adapter member securing end of the attachment member is looped around the attachment member anchor.

16. The caster adapter of claim 15, further comprising:
a taper on the first side panel extending from a position along the first side panel second side surface and ending proximate the connecting base;

a taper on the second side panel extending from a position along the second side panel second side surface and ending proximate the connecting base; and wherein the attachment member is removably coupled to the adapter member and the containment member.

17. A method of using a caster adapter, comprising:
providing a caster adapter, the caster adapter having at least two panels forming sides thereof, wherein the at least two panels define an interior of the caster adapter, the caster adapter having a leg conforming portion extending along at least a portion of the caster adapter wherein the leg conforming portion protrudes away from the interior of the caster adapter and wherein the leg conforming portion generally corresponds to a protrusion that extends along at least a portion of the leg of an object; and installing the caster adapter onto the leg of the object, wherein the installing step includes aligning the leg conforming portion of the caster adapter with the protrusion on the leg of the object such that when installed the leg conforming portion will be positioned proximate the protrusion on the leg.

18. The method of claim 17, further comprising:

the caster adapter having at least one opening in a side thereof;

wherein the installing step includes installing the caster adapter onto the leg of the object by inserting a portion of the leg through one of the openings; and retaining at least a portion of the leg within the interior of the caster adapter through the use of a containment member extending at least partially across one of the openings.

19. The method of claim 18, wherein:

the retaining step further comprises retaining the caster adapter on the leg by at least partially blocking the opening with a containment member such that when lifting the object while the caster adapters are installed thereon, the caster adapter will not slip off of the leg of the object due to the interaction between the leg conforming portion of the caster adapter with the leg protrusion of the leg of the object.

20. The method of claim 18, further comprising:

the retaining step further comprising providing a retainment member on a free end of the containment member, wherein the retainment member is movable between a locking position and an insertion position;

placing the retainment member in the insertion position in order to insert at least a portion of the containment member into the caster adapter proximate at least one opening;

once the containment member is in position along the desired opening on the caster adapter, allowing the retainment member to move into its locking position in order to retain the containment member in position; and providing an attachment member to couple the caster adapter and the containment member when the containment member is not in position along an opening.

* * * * *